(12) United States Patent
Patel et al.

(10) Patent No.: US 10,809,676 B2
(45) Date of Patent: *Oct. 20, 2020

(54) BUILDING HVAC SYSTEM WITH MULTI-LEVEL MODEL PREDICTIVE CONTROL

(71) Applicant: Johnson Controls Technology Company, Auburn Hills, MI (US)

(72) Inventors: Nishith R. Patel, Snellville, GA (US); Matthew J. Ellis, Milwaukee, WI (US); Michael J. Wenzel, Oak Creek, WI (US); Robert D. Turney, Watertown, WI (US); Brett M. Lenhardt, Waukesha, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,391

(22) Filed: Oct. 14, 2019

(65) Prior Publication Data

US 2020/0041966 A1 Feb. 6, 2020

Related U.S. Application Data

(63) Continuation of application No. 15/635,754, filed on Jun. 28, 2017.

(Continued)

(51) Int. Cl.
*G05D 7/00* (2006.01)
*G05D 11/00* (2006.01)
(Continued)

(52) U.S. Cl.
CPC ............ *G05B 13/048* (2013.01); *F24F 11/30* (2018.01); *F24F 11/62* (2018.01); *G05B 13/041* (2013.01);
(Continued)

(58) Field of Classification Search
CPC . F24F 11/62; F24F 11/30; F24F 11/46; G05B 15/02; G05B 17/02
(Continued)

(56) References Cited

U.S. PATENT DOCUMENTS 8,903,554 B2 12/2014 Stagner
9,235,657 B1 1/2016 Wenzel et al.
(Continued)

OTHER PUBLICATIONS

Afram et al., Theory and applications of HVAC COntrol Systems—A review of model predictive control (MPC), Building and Environment, Feb. 1, 2014, pp. 343-355.
(Continued)

*Primary Examiner* — Md Azad
(74) *Attorney, Agent, or Firm* — Foley & Lardner LLP

(57) ABSTRACT

A heating, ventilation, or air conditioning (HVAC) system for a building includes indoor subsystems, a high-level controller, and low-level controllers. Each indoor subsystem includes one or more indoor units configured to provide heating or cooling to one or more building spaces. The high-level controller generates a plurality of indoor subsystem energy targets, each indoor subsystem energy target corresponding to one of the plurality of indoor subsystems and generated based on a thermal capacitance of one or more building spaces to which heating or cooling is provided by the corresponding indoor subsystem. Each low-level indoor controller corresponds to one of the indoor subsystems and generates indoor setpoints for the one or more indoor units of the corresponding indoor subsystem using the indoor subsystem energy target for the corresponding indoor subsystem and operates the one or more indoor units of the corresponding indoor subsystem using the indoor setpoints.

20 Claims, 9 Drawing Sheets

Related U.S. Application Data

(60) Provisional application No. 62/357,338, filed on Jun. 30, 2016.

(51) Int. Cl.

| | | |
|---|---|---|
| *G05B 13/04* | (2006.01) | |
| *G05B 15/02* | (2006.01) | |
| *G05B 17/02* | (2006.01) | |
| *F24F 11/62* | (2018.01) | |
| *F24F 11/30* | (2018.01) | |
| *G05D 7/06* | (2006.01) | |
| *F24F 11/46* | (2018.01) | |

(52) U.S. Cl.
CPC ............. *G05B 15/02* (2013.01); *G05B 17/02* (2013.01); *G05D 7/0617* (2013.01); *F24F 11/46* (2018.01); *G05B 2219/2642* (2013.01)

(58) Field of Classification Search
USPC .......................................................... 700/282
See application file for complete search history.

(56) References Cited

U.S. PATENT DOCUMENTS

| | | | |
|---|---|---|---|
| 9,300,141 | B2 | 3/2016 | Marhoefer |
| 9,429,923 | B2 | 8/2016 | Ward et al. |
| 9,436,179 | B1 | 9/2016 | Turney et al. |
| 10,277,034 | B2 | 4/2019 | Marhoefer |
| 10,389,136 | B2 | 8/2019 | Drees |
| 2007/0203860 | A1 | 8/2007 | Golden et al. |
| 2008/0000241 | A1 | 1/2008 | Larsen et al. |
| 2012/0022702 | A1 | 1/2012 | Jang |
| 2012/0130556 | A1 | 5/2012 | Marhoefer |
| 2013/0162037 | A1 | 6/2013 | Kim et al. |
| 2014/0094979 | A1 | 4/2014 | Mansfield |
| 2014/0188295 | A1 | 7/2014 | Saito et al. |
| 2014/0277761 | A1 | 9/2014 | Matsuoka et al. |
| 2014/0365017 | A1 | 12/2014 | Hanna et al. |
| 2015/0176848 | A1* | 6/2015 | Jung ..................... F25B 13/00 165/221 |
| 2015/0267932 | A1 | 9/2015 | Kim et al. |
| 2015/0277467 | A1 | 10/2015 | Steven et al. |
| 2015/0316902 | A1 | 11/2015 | Wenzel et al. |
| 2015/0316907 | A1 | 11/2015 | Elbsat et al. |
| 2015/0378381 | A1* | 12/2015 | Tinnakornsrisuphap ................... G05F 1/66 700/276 |
| 2016/0091904 | A1 | 3/2016 | Horesh et al. |
| 2016/0098022 | A1 | 4/2016 | Wenzel et al. |
| 2016/0172859 | A1 | 6/2016 | Marhoefer |
| 2016/0245539 | A1* | 8/2016 | Motomura ........... G05B 19/042 |
| 2016/0305678 | A1 | 10/2016 | Pavlovski et al. |
| 2016/0313751 | A1 | 10/2016 | Risbeck et al. |
| 2016/0322835 | A1 | 11/2016 | Carlson et al. |
| 2017/0030598 | A1 | 2/2017 | Burns et al. |
| 2017/0102675 | A1 | 4/2017 | Drees |
| 2017/0104337 | A1 | 4/2017 | Drees |
| 2017/0104449 | A1 | 4/2017 | Drees |
| 2017/0234559 | A1 | 8/2017 | Federspiel et al. |
| 2017/0237259 | A1 | 8/2017 | Yoon et al. |
| 2017/0350625 | A1 | 12/2017 | Burns et al. |
| 2018/0004171 | A1 | 1/2018 | Patel et al. |
| 2018/0100668 | A1* | 4/2018 | Huang ..................... F24F 13/30 |
| 2018/0180337 | A1* | 6/2018 | Luo ........................ F25B 13/00 |
| 2018/0195741 | A1 | 7/2018 | Field et al. |
| 2018/0196456 | A1 | 7/2018 | Elbsat |
| 2018/0197253 | A1 | 7/2018 | Elbsat et al. |
| 2018/0224814 | A1 | 8/2018 | Elbsat et al. |
| 2018/0285800 | A1 | 10/2018 | Wenzel et al. |
| 2018/0340700 | A1* | 11/2018 | Chen ..................... F25B 41/04 |
| 2019/0115785 | A1 | 4/2019 | Kallamkote et al. |
| 2020/0059098 | A1 | 2/2020 | Dong et al. |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Ma et al., Predictive Control for Energy Efficient Buildings with Thermal Storage: Modeling, Stimulation, and Experiments, IEEE Control Systems, Feb. 1, 2012, pp. 44-64.

Moritz Hardt, Tengyu Ma, and Benjamin Recht. Gradient Descent Learns Linear Dynamical Systems. arXiv preprint arXiv:1609.05191, 2016, 44 pages.

Morosan et al., Building temperature regulation using a distributed model predictive control, Energy and Buildings, Sep. 1, 2010, pp. 1445-1452.

Nevena et al. Data center cooling using model-predictive control, 10 pages. 2018.

Search Report for International Application No. PCT/US2017/039798, dated Sep. 15, 2017, 15 pages.

Search Report for International Application No. PCT/US2017/039937, dated Sep. 21, 2017, 16 pages.

Search Report for International Application No. PCT/US2018/029625, dated Aug. 2, 2018, 14 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

Zhao et al., An Energy Management System for Building Structures Using a Multi-Agent Decision-Making Control Methodology, Jan./Feb. 2013, 9 pages.

Berggren et al., LCE analysis of buildings—Taking the step towards Net Zero Energy Buildings, Nov. 30, 2012 , Energy and Buildings 62 (2013) 381-391. (Year: 2012).

Carrasco et al., Power Electronic Systems for the Grid Interaction of Renewable Energy Sources: a Survey, Jun. 2006, IEEE Transactions on Industrial Electronics, vol. 53 Iss. 4, Year 2006.

Cellura et al., Energy life-cycle approach in Net zero energy buildings balance: Cross Mark Operation and embodied energy of an Italian case study, May 4, 2013, Energy and Buildings 72 (2014) 371-381. (Year: 2013).

(56) References Cited

OTHER PUBLICATIONS

Cordiner et al., A study on the energy management in domestic micro-grids based on Model Predictive Control strategies, Feb. 25, 2015, Energy Conversion and Management 102 (2015) 50-58, (Year 2015).
Gelazanskas et al., Demand side management in smart grid: A review and proposals for future direction, Sustainable Cities and Society 11, Year 2014, pp. 22-30.
Hamdy et al., A multi-stage optimization method for cost-optimal and nearly-zero-energy building solutions in line with the EPBD-recast 201 O, Apr. 4, 2012, Energy and Bui ldings 56 (2013) 189-203. (Year: 2012).
Li et al., Zero energy buildings and sustainable development implications—A review, Aug. 28, 2012, Energy 54 (2013) 1-10. (Year: 2012).
Lu et al., Design optimization and optimal control of grid-connected and standalone nearly/net zero energy buildings, Apr. 21, 2015, Applied Energy 155 (2015) 463-477. (Year: 2015).
Pikas et al., "Cost optimal and nearly zero energy building solutions for office buildings", Aug. 27, 2013, Energy and Buildings 74 (2014) 30-42. (Year: 2013).
Ma et. al., "Predictive Control for Energy Efficient Buildings with Thermal Storage: Modeling, Stimulation, and Experiments", IEEE Control Systems, vol. 32, No. 1, Feb. 2012, pp. 44-49.
Office Action on CN 201780040984.8, dated Mar. 25, 2020, 19 pages with translation.
Zhao et. al., "An Energy Management System for Building Structures Using a Multi-Agent Decision-Making Control Methodology", IEEE Transactiona on Industry Applications, vol. 49, No. 1, Jan./Feb., 2013, pp. 322-330.

\* cited by examiner

BUILDING HVAC SYSTEM WITH MULTI-LEVEL MODEL PREDICTIVE CONTROL

CROSS-REFERENCE TO RELATED PATENT APPLICATIONS

This application is a continuation of U.S. patent application Ser. No. 15/635,754 filed Jun. 28, 2017, which claims the benefit of and priority to U.S. Provisional Patent Application No. 62/357,338 filed Jun. 30, 2016. The entire disclosures of both these patent applications are incorporated by reference herein.

BACKGROUND

The present disclosure relates generally to a model predictive control (MPC) system for a building heating, ventilation, and air conditioning (HVAC) system. The present disclosure relates more particularly to a MPC system for optimizing energy cost in a variable refrigerant flow (VRF) system including an outdoor subsystem and a plurality of indoor subsystems.

Commercial buildings consume approximately 20% of the total U.S. energy consumption and account for roughly $200 billion per year in primary energy expenditures. The Energy Information Administration projects that commercial floor space and primary energy consumption will continue to grow into the future. Average energy prices, on the other hand, are expected to remain relatively stable. Therefore, the amount spent on energy in commercial buildings will continue to increase significantly. Given the significance of these energy cost values and their projected growth, buildings have become a prime target for control strategies designed to reduce consumption or improve efficiency, particularly in the area of temperature control.

Many HVAC systems in commercial buildings and educational facilities use simple on/off and proportional-integral-derivative (PID) controllers for control of their equipment. They rely on temperature controllers whose only goal is to converge to the desired temperature set point and stay there, within some tolerance. However, a better goal is to minimize total energy consumption or minimize total energy cost. In a utility market with time-varying prices, there exists the potential for cost savings by temporally shifting heating or cooling loads using some form of energy storage. To achieve these savings, predictive optimization can be used with a model of the system to forecast the future load. Load shifting decreases the burden on power plants during peak hours, allowing them to operate more efficiently. Furthermore, chillers operate more efficiently at night when the cooling water temperature is lower.

MPC is a method of advanced process control that has been highly successful over the past two decades. MPC uses a model of the system that relates the inputs (control actions) to outputs (process measurements). The model is used to predict the process variables based on the actions taken by the controller over a period of time called the horizon. At each step, MPC solves an online optimization problem using this model to determine a sequence of control actions that achieve an objective such as minimizing tracking error or input usage while respecting process constraints such as equipment capacity and safety bounds. The first control action in the sequence is implemented and the optimization problem is solved again at the next step after new measurements are obtained. In economic MPC, the objective in the optimization problem is to minimize total cost.

Economically optimal control systems have not been deployed widely in the HVAC industry. One fundamental obstacle to the successful deployment of MPC in HVAC systems is the large number of building zones. To implement MPC in HVAC systems, it may be desirable to solve the optimization problem in a reasonably short time (e.g., on the order of a few minutes). Campus-wide implementations may contain hundreds of buildings and zones. A single, combined control system for these applications is impractical and undesirable since the resulting single optimization problem is too large to solve in real time.

SUMMARY

One implementation of the present disclosure is a model predictive control system for optimizing energy cost in a variable refrigerant flow (VRF) system. The VRF system includes an outdoor subsystem and a plurality of indoor subsystems. The model predictive control system includes a high-level model predictive controller (MPC) and a plurality of low-level indoor MPCs. The high-level MPC is configured to perform a high-level optimization to generate an optimal indoor subsystem load profile for each of the plurality of indoor subsystems. The optimal indoor subsystem load profiles optimize the energy cost. Each of the low-level indoor MPCs corresponds to one of the indoor subsystems and is configured to perform a low-level optimization to generate optimal indoor setpoints for one or more indoor VRF units of the corresponding indoor subsystem using the optimal indoor subsystem load profile for the corresponding indoor subsystem. Each of the low-level indoor MPCs is configured to operate the indoor VRF units of the corresponding indoor subsystem using the optimal indoor setpoints.

In some embodiments, each of the optimal indoor subsystem load profiles includes a thermal energy allocation to one of the indoor subsystems at each of a plurality of time steps in an optimization period. In some embodiments, each low-level indoor MPC is configured to use the thermal energy allocation to the corresponding indoor subsystem as an optimization constraint when performing the low-level optimization.

In some embodiments, the optimal indoor setpoints include at least one of refrigerant flow setpoints for each of the indoor VRF units and temperature setpoints for one or more building zones controlled by the indoor VRF units.

In some embodiments, each indoor subsystem includes a plurality of building zones. Each of the low-level indoor MPCs can be configured to generate optimal indoor temperature setpoints for each of the plurality of building zones in the corresponding indoor subsystem.

In some embodiments, each indoor subsystem includes a plurality of indoor VRF units. Each of the low-level indoor MPCs can be configured to generate optimal refrigerant flow decisions for each of the plurality of indoor VRF units in the corresponding indoor subsystem and use the optimal refrigerant flow decisions to calculate at least one of flow setpoints, temperature setpoints, and valve setpoints for each of the plurality of indoor VRF units.

In some embodiments, each of the low-level indoor MPCs is configured to identify a relationship between thermal energy load and refrigerant flow for each of the indoor VRF units in the corresponding indoor subsystem. Each of the low-level indoor MPCs can use the identified relationships between thermal energy load and refrigerant flow to generate the optimal refrigerant flow decisions for each of the indoor VRF units in the corresponding indoor subsystem.

In some embodiments, the high-level MPC is configured to generate predicted temperature profiles for each indoor subsystem resulting from the optimal indoor subsystem load profiles. In some embodiments, the low-level indoor MPCs are configured to generate the optimal indoor setpoints by minimizing an error between indoor subsystem temperatures and the predicted temperature profiles.

In some embodiments, each of the indoor subsystems represents a separate building thermally decoupled from one another such that no direct heat exchange occurs between the indoor subsystems.

In some embodiments, the high-level MPC is configured to generate an optimal outdoor unit demand profile for the outdoor subsystem. The system can include a low-level outdoor MPC configured to perform a low-level optimization to generate optimal outdoor setpoints for one or more outdoor VRF units of the outdoor subsystem subject to a demand constraint based on the optimal outdoor unit demand profile. The low-level outdoor MPC can be configured to use the optimal outdoor setpoints to operate the outdoor VRF units.

In some embodiments, the high-level MPC is configured to determine an optimal thermal energy allocation to each of the plurality of indoor subsystems at each of a plurality of time steps in an optimization period and an optimal thermal energy or refrigerant state allocation of the outdoor subsystem at each of the plurality of time steps in the optimization period.

Another implementation of the present disclosure is a method for optimizing energy cost in a variable refrigerant flow (VRF) system. The VRF system includes an outdoor subsystem and a plurality of indoor subsystems. The method includes performing a high-level optimization at a high-level model predictive controller (MPC) to generate an optimal indoor subsystem load profile for each of the plurality of indoor subsystems. The optimal indoor subsystem load profiles optimize the energy cost. The method includes providing the optimal indoor subsystem load profiles from the high-level MPC to a plurality of low-level indoor MPCs. Each of the low-level indoor MPCs corresponds to one of the plurality of indoor subsystems. The method includes performing a low-level optimization at each of the low-level indoor MPCs to generate optimal indoor setpoints for one or more indoor VRF units of the corresponding indoor subsystem using the optimal indoor subsystem load profile for the corresponding indoor subsystem. The method includes using the optimal indoor setpoints to operate the indoor VRF units in each of the plurality of indoor subsystems.

In some embodiments, each of the optimal indoor subsystem load profiles includes a thermal energy allocation to one of the indoor subsystems at each of a plurality of time steps in an optimization period. In some embodiments, performing the low-level optimization includes using the thermal energy allocation to the corresponding indoor subsystem as an optimization constraint.

In some embodiments, the optimal indoor setpoints include at least one of refrigerant flow setpoints for each of the indoor VRF units and temperature setpoints for one or more building zones controlled by the indoor VRF units.

In some embodiments, each indoor subsystem includes a plurality of building zones. Performing the low-level optimization can include generating optimal indoor temperature setpoints for each of the plurality of building zones in the corresponding indoor subsystem.

In some embodiments, each indoor subsystem includes a plurality of indoor VRF units. Performing the low-level optimization can include generating optimal refrigerant flow decisions for each of the plurality of indoor VRF units in the corresponding indoor subsystem and using the optimal refrigerant flow decisions to calculate at least one of flow setpoints, temperature setpoints, and valve setpoints for each of the plurality of indoor VRF units.

In some embodiments, performing the low-level optimization includes identifying a relationship between thermal energy load and refrigerant flow for each of the indoor VRF units in the corresponding indoor subsystem and using the identified relationships between thermal energy load and refrigerant flow to generate the optimal refrigerant flow decisions for each of the indoor VRF units in the corresponding indoor subsystem.

In some embodiments, performing the high-level optimization includes generating predicted temperature profiles for each indoor subsystem resulting from the optimal indoor subsystem load profiles. In some embodiments, performing the low-level optimization includes generating the optimal indoor setpoints by minimizing an error between indoor subsystem temperatures and the predicted temperature profiles.

In some embodiments, performing the high-level optimization includes generating an optimal outdoor unit demand profile for the outdoor subsystem. The method can further include performing a low-level optimization at a low-level outdoor model predictive controller to generate optimal outdoor setpoints for one or more outdoor VRF units of the outdoor subsystem subject to a demand constraint based on the optimal outdoor unit demand profile. The method can further include using the optimal outdoor setpoints to operate the outdoor VRF units.

In some embodiments, performing the high-level optimization includes determining an optimal thermal energy allocation to each of the plurality of indoor subsystems at each of a plurality of time steps in an optimization period and an optimal thermal energy or refrigerant state allocation of the outdoor subsystem at each of the plurality of time steps in the optimization period.

Another implementation of the present disclosure is a variable refrigerant flow (VRF) system. The VRF system includes a plurality of indoor subsystems, an outdoor subsystem, a high-level model predictive controller (MPC), and a plurality of low-level indoor MPCs. Each indoor subsystem includes one or more indoor VRF units. The outdoor subsystem includes one or more outdoor VRF units. The high-level MPC is configured to perform a high-level optimization to generate an optimal indoor subsystem load profile for each of the plurality of indoor subsystems. The optimal indoor subsystem load profiles optimize energy cost. Each low-level indoor MPC corresponds to one of the indoor subsystems and is configured to perform a low-level optimization to generate optimal indoor setpoints for the indoor VRF units of the corresponding indoor subsystem using the optimal indoor subsystem load profile for the corresponding indoor subsystem.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1A:
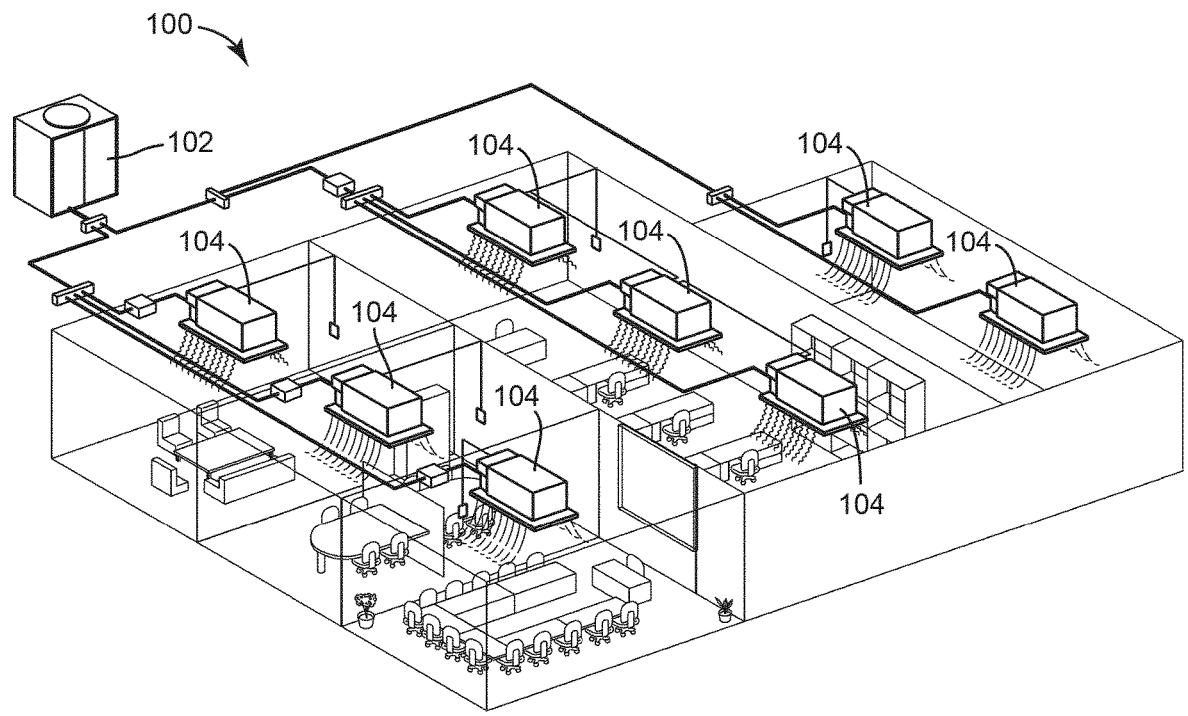
FIGS. 1A-1B are drawings of a variable refrigerant flow (VRF) system having one or more outdoor VRF units and a plurality of indoor VRF units, according to some embodiments.

Referring generally to the FIGURES, a model predictive control (MPC) system for a variable refrigerant flow (VRF) system is shown, according to some embodiments. MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

The MPC system described herein can optimize (e.g., minimize) the total cost of energy used to provide heating and/or cooling to a building or campus. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Energy costs can be decreased by concentrating equipment usage to times of low resource prices, all while maintaining comfort limits within each building.

In some embodiments, the MPC system includes a MPC layer and a regulatory layer. The MPC layer can receive measurements from the regulatory layer and provide setpoints to the regulatory layer. The MPC layer can generate optimal values for various decision variables including, for example, zone temperature setpoints, refrigerant flow rates, and equipment on/off decisions. The MPC layer can determine the optimal values of the decision variables using system models such a zone temperature to cooling/heating duty model, a cooling/heating duty to temperature setpoint model, and equipment models. The MPC layer can determine the optimal values of the decision variables by performing an optimization process subject to several constraints. The constraints can include comfort bounds on the zone air temperatures, equipment capacity constraints, refrigerant balance constraints, and rate of change bounds on the equipment of the regulatory layer.

Solving a single MPC problem to determine the optimal values for all of the decision variables can be difficult for large-scale applications. For example, some VRF systems can include thousands of discrete zones and thousands of unique HVAC devices. The discrete decisions (e.g., turning equipment on/off) can result in a mixed integer optimization problem, which further increases complexity. Due to the difficulty and computational complexity of the MPC problem, the MPC layer can decompose the overall MPC problem into smaller, more manageable, optimization problems.

The distributed MPC system can decompose the overall MPC problem into a high-level optimization problem and a low-level optimization problem. The high-level problem can be solved by a high-level model predictive controller to determine a load profile for each of a plurality of low-level indoor subsystems and a demand profile for an outdoor subsystem. The indoor subsystems can include indoor VRF units, whereas the outdoor subsystem can include outdoor VRF units. In some embodiments, the high-level controller uses aggregate low-level models for each indoor subsystem to reduce computational complexity. The high-level controller can determine load profiles that optimize (e.g., minimize) the total operational cost of the MPC system over the optimization period. Each load profile can include a load value for each time step in the optimization period. The high-level controller can provide the load profiles to a plurality of low-level indoor model-predictive controllers. The low-level indoor controllers can use the load profiles as constraints defining maximum permissible load values for each indoor subsystem for each time step in the optimization period.

The low-level optimization problem can be further decomposed into a low-level outdoor optimization problem and one or more low-level indoor optimization problems. Each low-level indoor problem can be solved by one of low-level indoor controllers to determine zone temperature setpoints and/or refrigerant flow setpoints for the indoor VRF units. Each low-level indoor controller can determine the zone temperature setpoints and/or refrigerant flow setpoints that optimize (e.g., minimize) the energy consumption of the corresponding indoor subsystem while maintaining zone temperatures within defined temperature limits and without exceeding the load values provided by the high-level controller. Alternatively, each low-level indoor controller can determine temperature setpoints and/or refrigerant flow setpoints that track the average indoor subsystem temperatures (e.g., predicted subsystem temperature states) from the high-level optimization problem. These and other components of the MPC system are described in greater detail below.

Variable Refrigerant Flow System

Figure 1B:
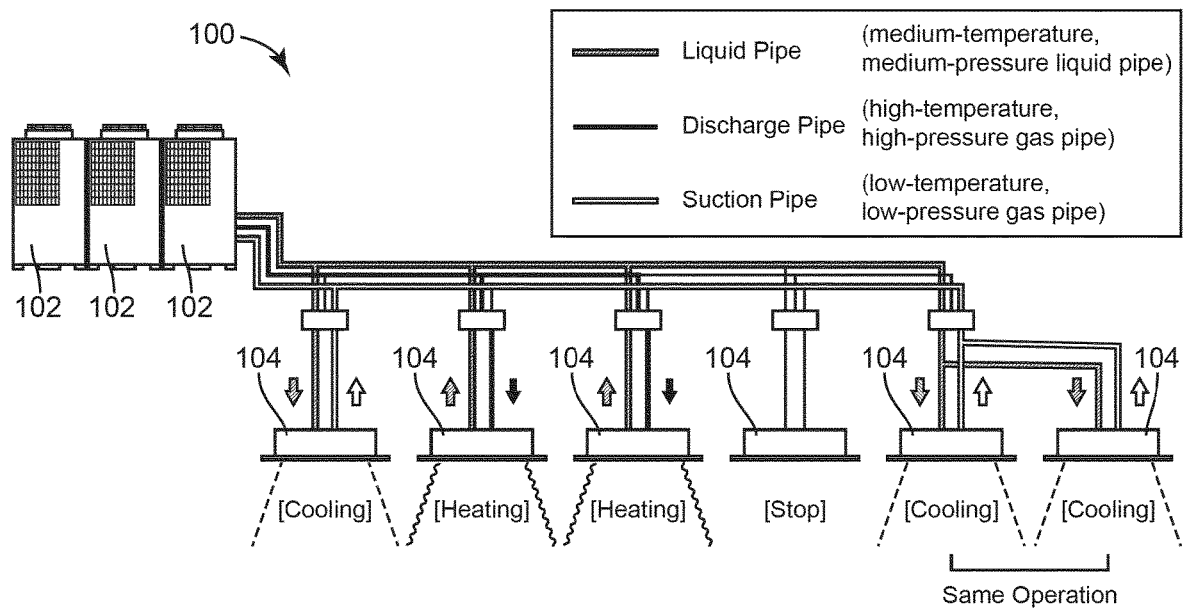

Referring now to FIGS. 1A-1B, a variable refrigerant flow (VRF) system 100 is shown, according to some embodiments. VRF system 100 is shown to include a plurality of outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit is located.

A primary advantage of VRF systems is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones).

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of the outdoor VRF units 102 operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system which can be used for VRF system 100 is described in detail below.

Figure 2A:
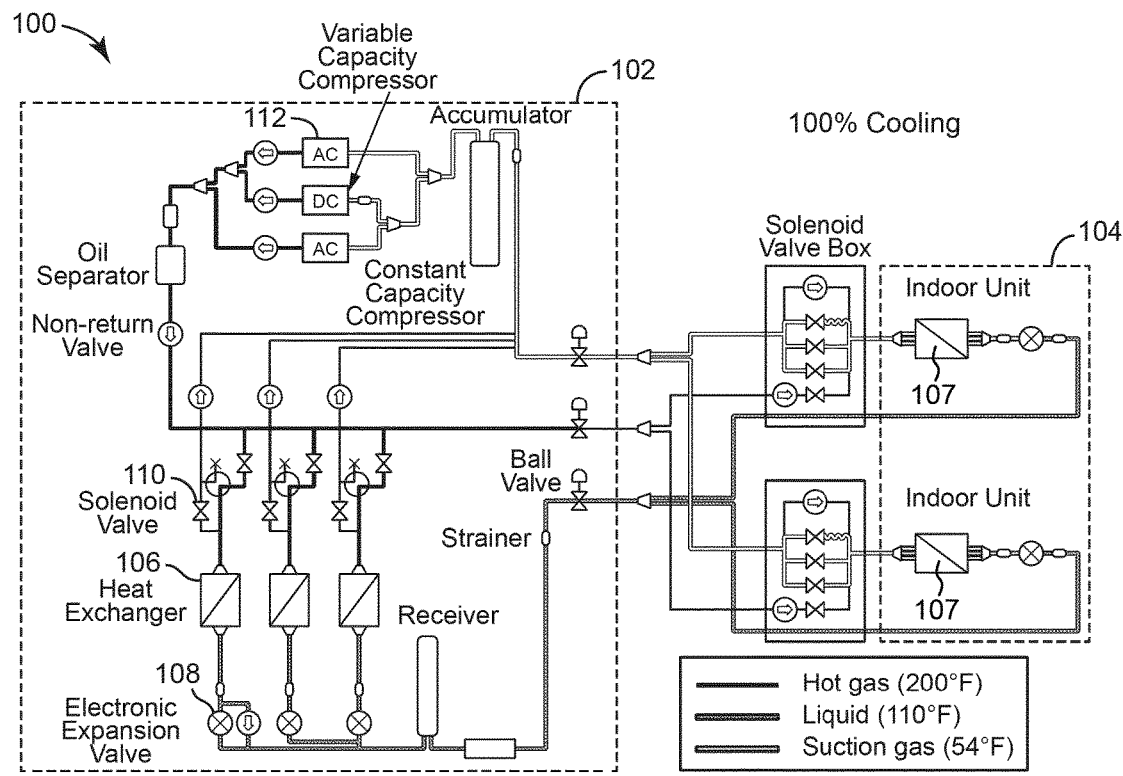
FIG. 2A is a diagram illustrating the operation of the VRF system of FIGS. 1A-1B in a cooling mode, according to some embodiments.
Figure 2B:
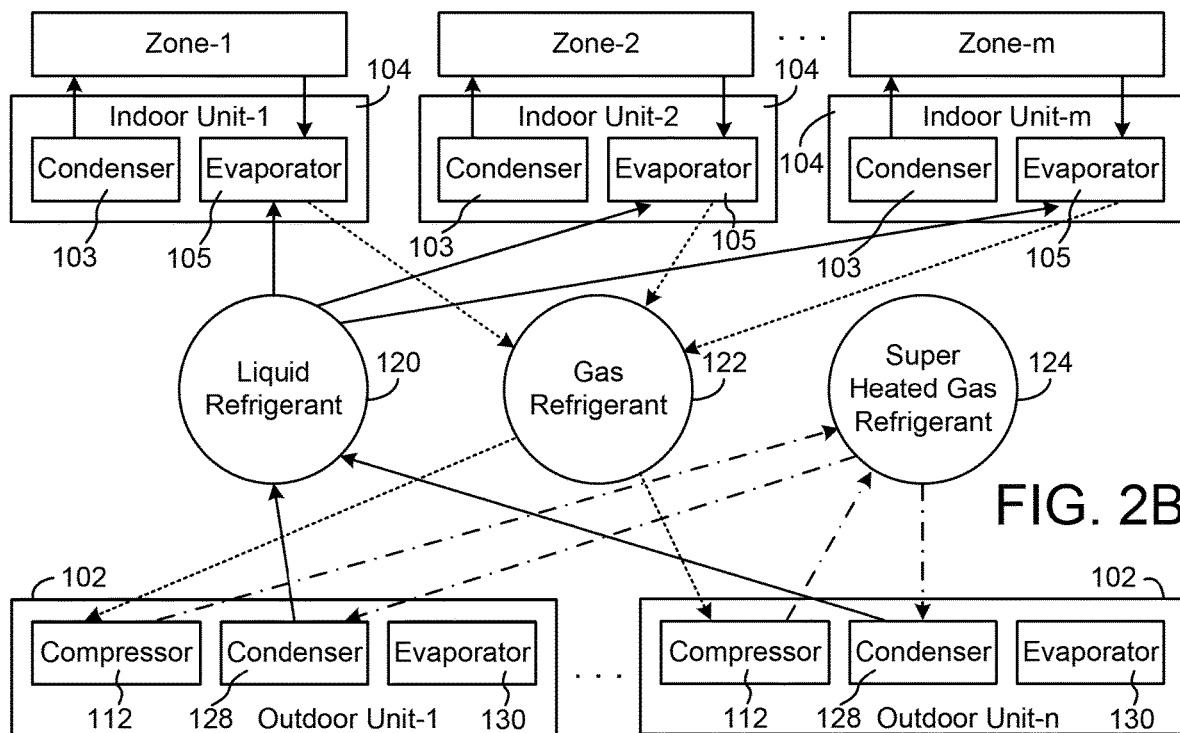
FIG. 2B is a directed graph illustrating the balance of refrigerant states when the VRF system operates in the cooling mode, according to some embodiments.
Figure 3A:
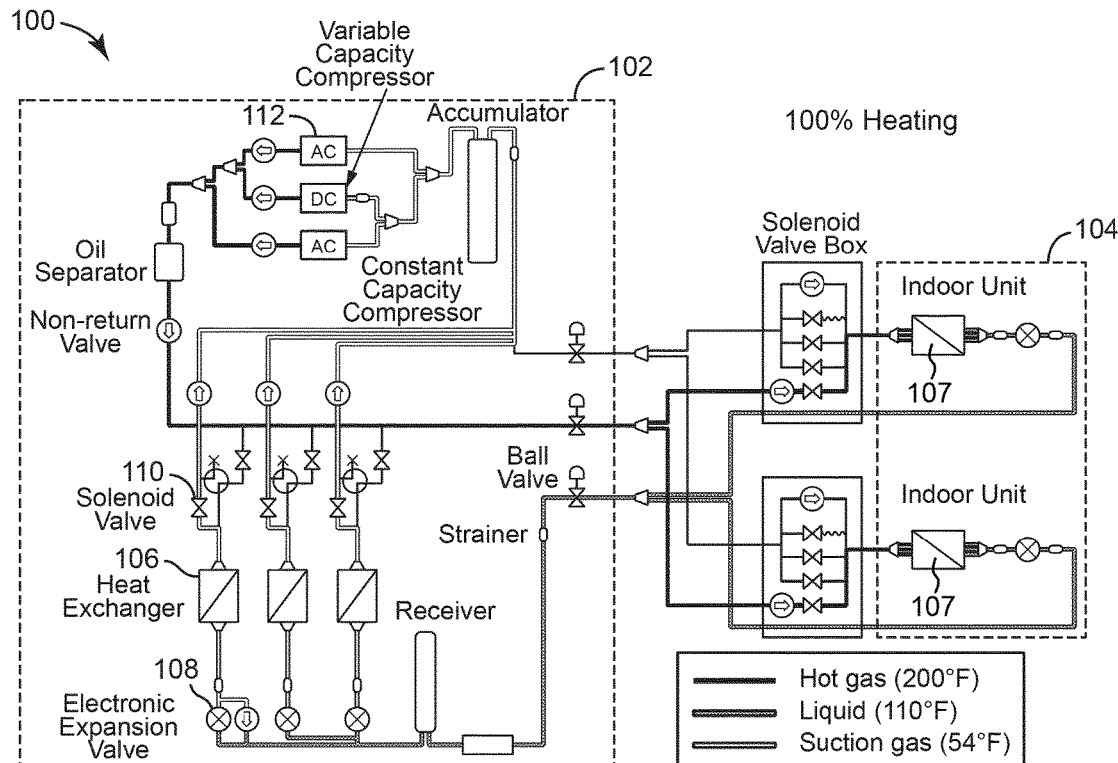
FIG. 3A is a diagram illustrating the operation of the VRF system of FIGS. 1A-1B in a heating mode, according to some embodiments.
Figure 3B:
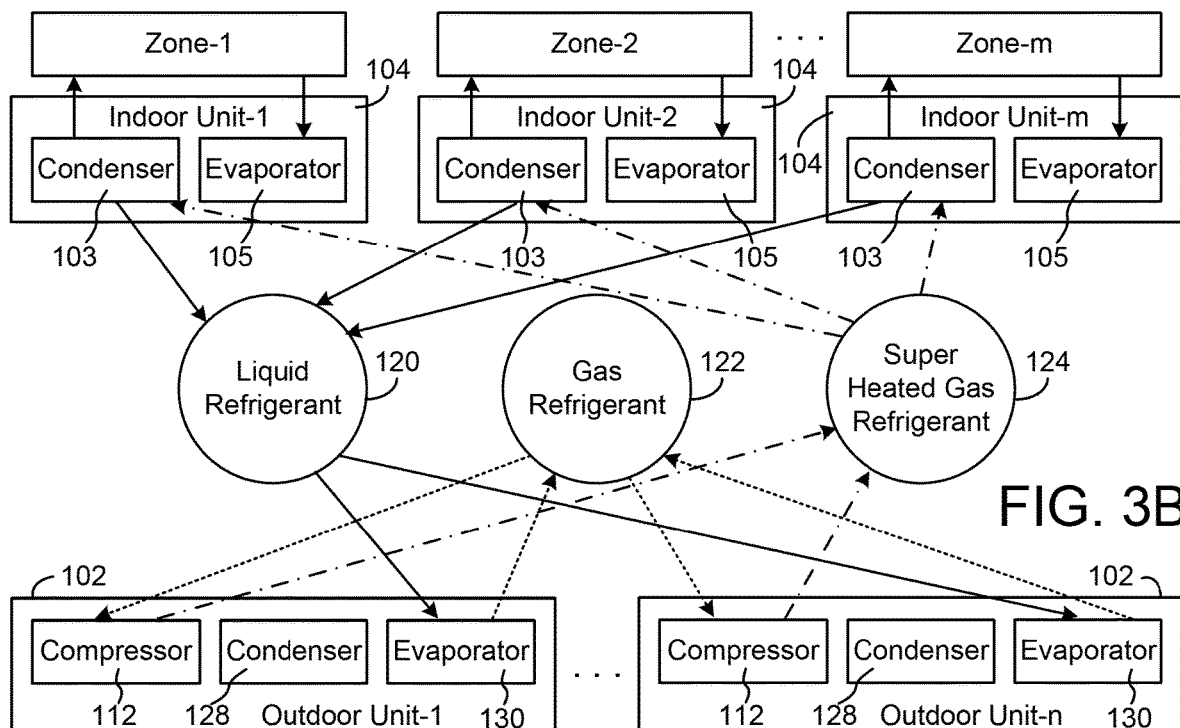
FIG. 3B is a directed graph illustrating the balance of refrigerant states when the VRF system operates in the heating mode, according to some embodiments.
Figure 4A:
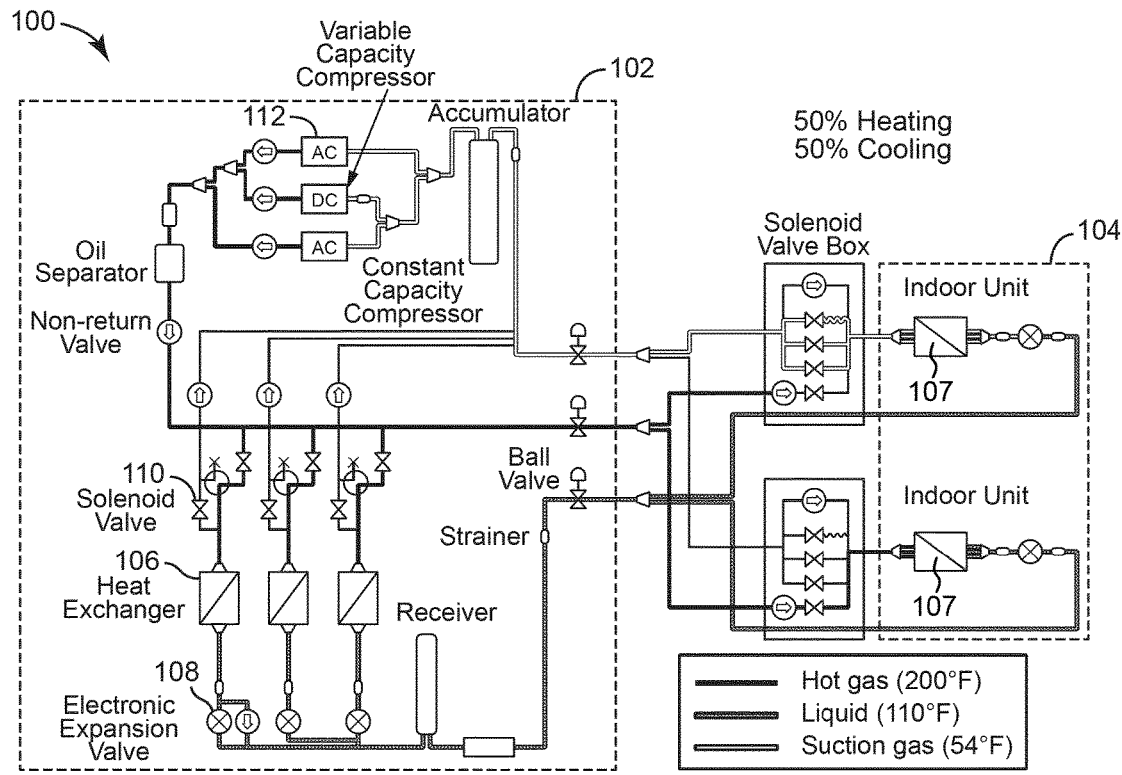
FIG. 4A is a diagram illustrating the operation of the VRF system of FIGS. 1A-1B in a combined heating and cooling mode, according to some embodiments.
Figure 4B:
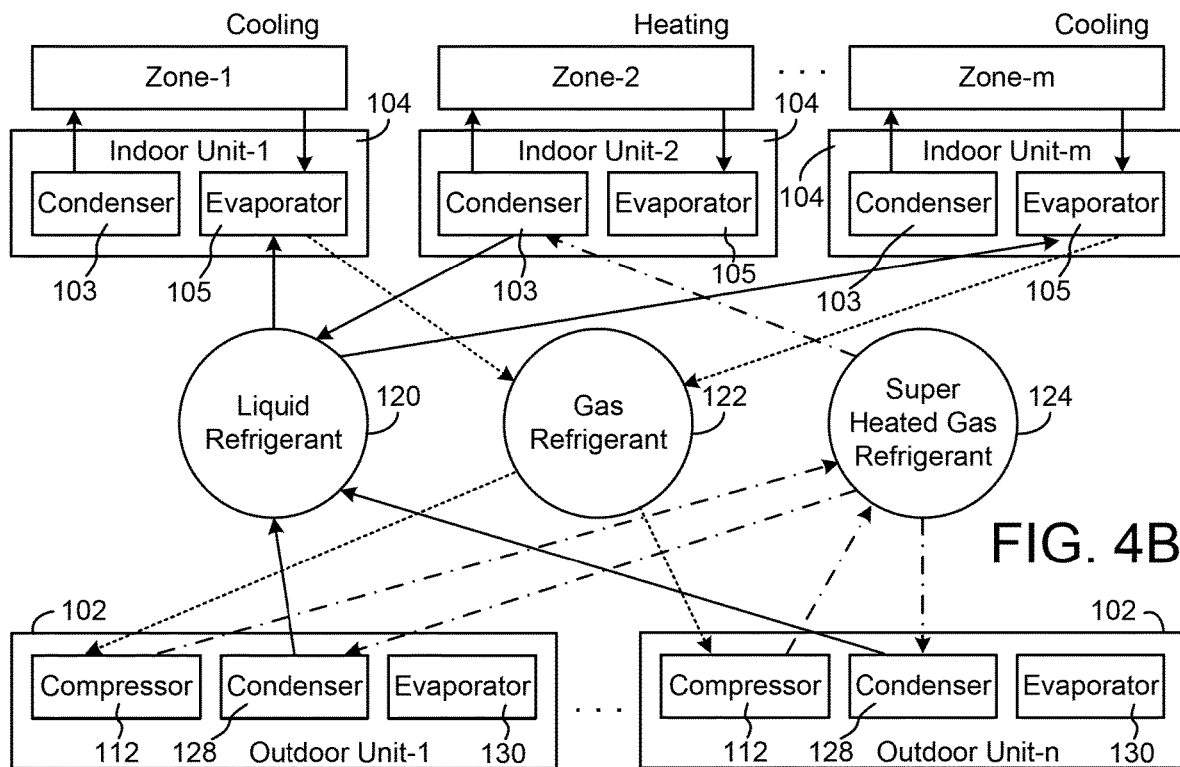
FIG. 4B is a directed graph illustrating the balance of refrigerant states when the VRF system operates in the combined heating and cooling mode, according to some embodiments.

Referring now to FIGS. 2A-4B, several diagrams illustrating the operation of VRF system 100 in a cooling mode, a heating mode, and a combined heating/cooling mode are shown, according to some embodiments. Each outdoor VRF unit 102 may include one or more heat exchangers 106 (as shown in FIGS. 2A, 3A, and 4A). When outdoor VRF units 102 operate in a cooling mode, heat exchangers 106 can operate as condensers 128 (as shown in FIGS. 2B and 4B) to provide cooling for the refrigerant. When outdoor VRF units 102 operate in a heating mode, heat exchangers 106 can be operated as evaporators 130 (as shown in FIG. 3B) to provide heating for the refrigerant. It is contemplated that condensers 128 and evaporators 130 may exist as separate devices within outdoor VRF units 102 or may exist as heat exchangers 106 which can be operated as both condensers 128 and evaporators 130 depending on the mode of operation of outdoor VRF units 102. Although only two outdoor VRF units 102 are shown, it should be understood that VRF system 100 can include any number n of outdoor VRF units 102.

Each indoor VRF unit 104 may include one or more heat exchangers 107 (as shown in FIGS. 2A, 3A, and 4A) When indoor VRF units 104 operate in a cooling mode, heat exchangers 107 can operate as evaporators 105 (as shown in FIGS. 2B and 4B) to provide cooling for the air delivered to the building zones. When indoor VRF units 104 operate in a heating mode, heat exchangers 107 can be operated as condensers 103 (as shown in FIG. 3B) to provide heating for the air delivered to the building zones. It is contemplated that condensers 103 and evaporators 105 may exist as separate devices within indoor VRF units 104 or may exist as heat exchangers 107 which can be operated as both condensers 103 and evaporators 105 depending on the mode of operation of indoor VRF units 104. Although only three indoor VRF units 104 are shown, it should be understood that VRF system 100 can include any number m of indoor VRF units 104.

Referring particularly to FIGS. 2A-2B, the operation of VRF system 100 in the cooling mode is shown, according to some embodiments. In the cooling mode, heat exchangers 106 of outdoor VRF units 102 operate as condensers 128 to condense a superheated gas refrigerant 124 into a liquid refrigerant 120. The liquid refrigerant 120 from heat exchangers 106 flows through the expansion valves (EEV) 108 and on to heat exchangers 107 of indoor VRF units 104. In the cooling mode, heat exchangers 107 operate as evaporators 105 to evaporate the liquid refrigerant 120 to a gas refrigerant 122, thereby absorbing heat from the air within the building zones and providing cooling for the building zones. Solenoid valves 110 allow for the gas refrigerant 122 to return to one or more compressors 112 of outdoor units 102. Compressors 112 compress the gas refrigerant 122 to create a superheated gas refrigerant 124, which is provided to condensers 128.

Referring now to FIGS. 3A-3B, the operation of VRF system 100 in the heating mode is shown, according to some embodiments. In the heating mode, heat exchangers 106 of outdoor VRF units 102 operate as evaporators 130 to evaporate the liquid refrigerant 120 from the indoor VRF units 104. Heat exchangers 106 transfer heat into the liquid refrigerant 120, thereby causing the liquid refrigerant 120 to evaporate and form a gas refrigerant 122. The gas refrigerant 122 is provided to compressors 112, which compress the gas refrigerant 122 to form a superheated gas refrigerant 124. The superheated gas refrigerant 124 is then provided to heat exchangers 107 of indoor VRF units 104. Heat exchangers 107 operate as condensers 102 to condense the superheated gas refrigerant 124 by transferring heat from the superheated gas refrigerant 124 to the building zones, thereby causing the superheated gas refrigerant 124 to lose heat and become the liquid refrigerant 120. The liquid refrigerant 120 is then returned to heat exchangers 106 outdoor VRF units 102.

Referring now to FIGS. 4A-4B, the operation of VRF system 100 in a combined heating and cooling mode is shown, according to some embodiments. In the combined heating/cooling model, some indoor and outdoor VRF units 102-104 operate in a heating mode while other indoor and outdoor VRF units 102-104 operate in a cooling mode. For example, indoor VRF unit-2 is shown operating in a heating mode, whereas indoor VRF unit-1 and indoor VRF unit-m are shown operating in the cooling mode. Both outdoor VRF unit-1 and outdoor VRF unit-n are shown operating in the cooling mode.

The operation of outdoor VRF units 102 in the cooling mode can be the same as previously described with reference to FIGS. 2A-2B. For example, outdoor VRF units 102 can receive the gas refrigerant 122 and condense the gas refrigerant 122 into a liquid refrigerant 120. The liquid refrigerant 120 can be routed to indoor VRF unit-1 and indoor VRF unit-m to provide cooling for zone-1 and zone-m. Heat exchangers 107 of indoor VRF unit-1 and indoor VRF unit-m operate as evaporators 105, by absorbing heat from building zone-1 and building zone-m, thereby causing the liquid refrigerant 120 to become a gas refrigerant 122. The gas refrigerant 122 is then delivered to compressors 112 of outdoor VRF units 1022. Compressors 112 compress the gas refrigerant 122 to form a superheated gas refrigerant 124. The superheated gas refrigerant 124 can be provided to heat exchangers 106 of outdoor VRF units 102, which operate as condensers 128 to condense the gas refrigerant 122 to liquid refrigerant 120. The superheated gas refrigerant 124 can also be provided to indoor VRF unit-2 and used to provide heating to building zone-2.

The operation of indoor VRF unit-2 in the heating mode can be the same as previously described with reference to FIGS. 3A-3B. For example, heat exchanger 107 of indoor VRF unit-2 can operate as a condenser 103 by rejecting heat from the superheated gas refrigerant 124 to building zone-2, thereby causing the superheated gas refrigerant 124 to become a liquid refrigerant 120. The liquid refrigerant 120 can be routed to heat exchangers 107 of indoor VRF unit-1 and indoor VRF unit-m, which operate as evaporators 105 to absorb heat from building zone-1 and building zone-m, as previously described.

In any of the operating modes, VRF system 100 can operate to ensure that the refrigerant states remain balanced. For example, when operating in the cooling mode, VRF system 100 can operate outdoor VRF units 102 and indoor VRF units 104 to ensure that outdoor VRF units 102 convert the gas refrigerant 122 to the liquid refrigerant 120 at the same rate that indoor VRF units 104 convert the liquid refrigerant 120 to the gas refrigerant 122. Similarly, when operating in the heating mode, VRF system 100 can operate outdoor VRF units 102 and indoor VRF units 104 to ensure that outdoor VRF units 102 convert the liquid refrigerant 120 to the superheated gas refrigerant 124 at the same rate that indoor VRF units 104 convert the superheated gas refrigerant 124 to the liquid refrigerant 120.

In each of the operating modes, VRF system 100 can operate outdoor VRF units 102 and indoor VRF units 104 to ensure that the amount of each refrigerant state produced (e.g., liquid refrigerant 120, gas refrigerant 122, and superheated gas refrigerant 124) by outdoor VRF units 102 and indoor VRF units 104 is equal to the amount of each refrigerant state consumed by outdoor VRF units 102 and indoor VRF units 104. In other words, VRF system 100 can balance the rates at which refrigerant is added and removed from each of the refrigerant states. In some embodiments, VRF system 100 imposes mass balance constraints or volume balance constraints to ensure that the net amount of refrigerant in each of the refrigerant states remains balanced at each time step of an optimization period.

In some embodiments, VRF system 100 is controlled using a predictive energy cost optimization framework. For example, VRF system 100 can include one or more controllers which perform a high-level optimization and a low-level optimization. The high-level optimization can seek to optimize the electricity usage costs plus the peak electricity charge (i.e., the electricity demand charge) across the entire VRF system 100 subject to several system constraints by manipulating the requested cooling or heating duty delivered to each zone and the operation modes of the indoor and outdoor VRF units 102-104. The constraints imposed in the high-level optimization can include system constraints such as the balance of refrigerant states (as previously described) and zone temperature constraints. The zone temperature constraints can require the temperature of each building zone to be maintained within an acceptable temperature range to maintain comfort of the occupants.

The low-level optimization can use the requested heating and cooling duty for each building zone computed by the high-level optimization as input data to the low-level optimization. The low-level optimization can manipulate the zone temperature setpoints for the various building zones such that the zone heating and cooling duties track the requested heating or cooling duty profile computed in the high-level optimization.

In some embodiments, the low-level optimization is distributed across several low-level model predictive controllers, each of which can operate to determine the temperature setpoints for a particular building zone. For example, the control system can include a high-level model predictive controller (MPC) and several low-level MPCs. The high-level MPC can determine an optimal load profile for each of the building zones and can distribute the optimal load profiles to the low-level MPCs for the building zones. Each low-level MPC can be configured to control a particular building zone and can receive the load profile for the corresponding building zone from the high-level MPC. Each low-level MPC can determine optimal temperature setpoints for the corresponding building zone using the load profile from the high-level MPC. An example of such a distributed implementation is described in greater detail with reference to FIG. 6.

Figure 5:
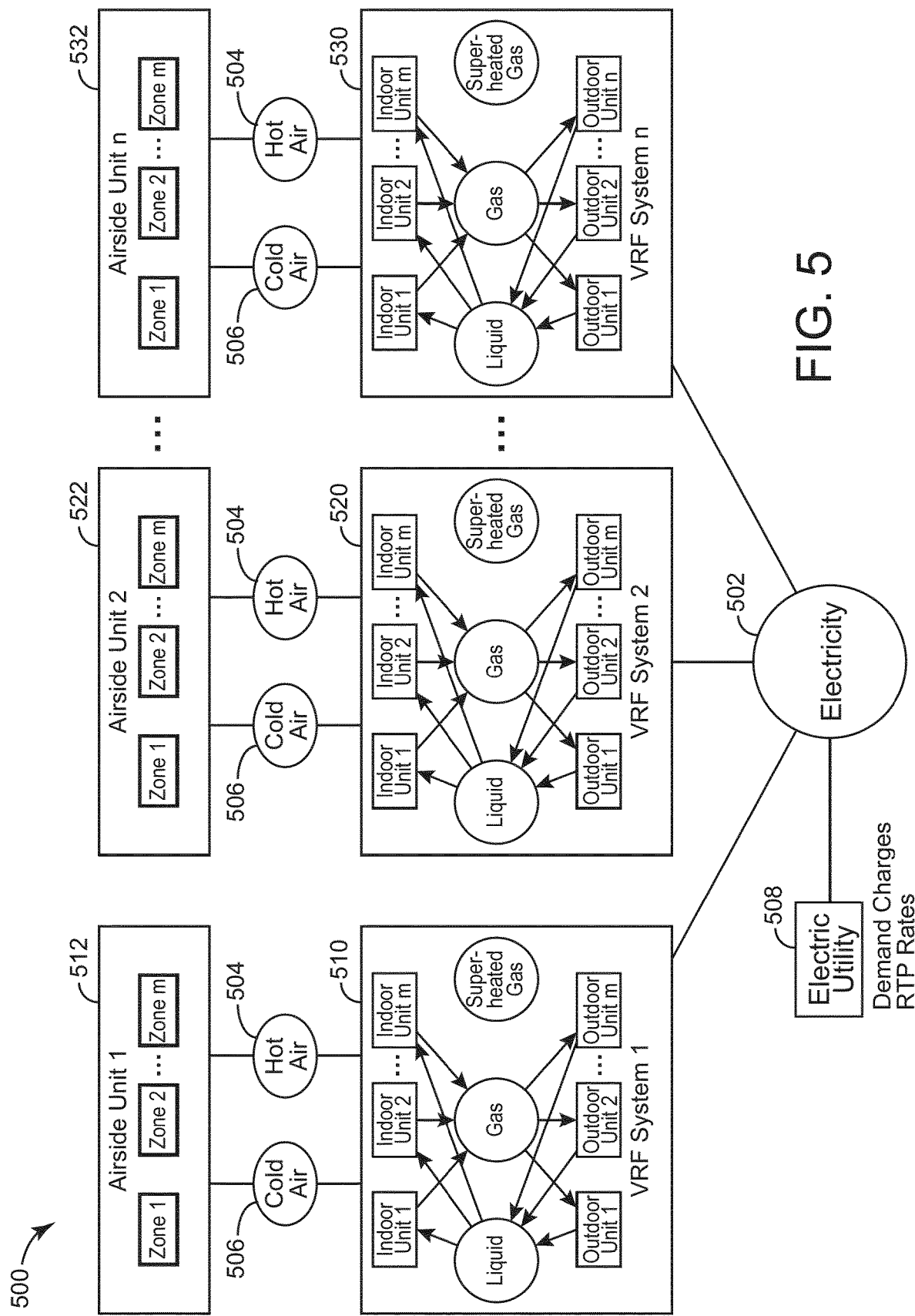
FIG. 5 is a block diagram of a control system for multiple VRF systems, according to some embodiments.

Referring now to FIG. 5, a block diagram of a control system 500 for multiple VRF systems 510, 520, and 530 is shown, according to some embodiments. Each of VRF systems 510-530 can include some or all of the components and/or features of VRF system 100, as described with reference to FIGS. 1A-4B. The optimization framework described above can be extended to a larger system including multiple VRF systems 510-530 by introducing an additional control layer (e.g., a supervisory layer) operating above the high-level and low-level optimization framework. For example, the predictive cost optimization controller can act as a coordinator to coordinate the electricity usage of multiple VRF systems 510-530 over time such that the multiple VRF systems 510-530 achieve an optimal energy cost performance (e.g., minimum total energy cost for the entire set of VRF systems 510-530).

In various embodiments, the cost optimization performed by the predictive cost optimization controller may account for energy cost (e.g., $/kWh of electricity consumed), demand charge (e.g., $/kW of peak power consumption), peak load contribution cost, and/or monetary incentives from participating in incentive-based demand response (IBDR) programs. Several examples of a cost optimization which can be performed by the predictive cost optimization controller are described in detail in U.S. patent application Ser. No. 15/405,236 filed Jan. 12, 2017, U.S. patent application Ser. No. 15/405,234 filed Jan. 12, 2017, U.S. patent application Ser. No. 15/426,962 filed Feb. 7, 2017, and U.S. patent application Ser. No. 15/473,496 filed Mar. 29, 2017. The entire disclosure of each of these patent applications is incorporated by reference herein.

In the supervisory layer, each of the individual VRF systems 510-530 can be represented as a single asset that converts electricity 502 from an electric utility 508 into either hot air 504 or cold air 506 that is required by the building zones. Hot air 504 and cold air 506 can be delivered to airside units 512, 522, and 532 that provide heating and/or cooling for the building zones served by airside units 512, 522, and 532. Hot air 504 and cold air 506 can be treated as resources produced by VRF systems 510-530, whereas electricity 502 can be treated as a resource consumed by VRF systems 510-530. The relationship between resource production and electricity consumption by each VRF system 510-530 may be defined by a system performance curve for each VRF system 510-530. The system performance curves can be used in the supervisory layer as constraints on the cost optimization performed by the predictive cost optimization controller to ensure that VRF systems 510-530 operate to generate sufficient hot air 504 and cold air 506 for the building zones.

The amount of hot air 504 and cold air 506 to be produced by each of VRF systems 510-530 at each time step of an optimization period can be determined by the predictive cost optimization controller by performing an asset allocation process. Several examples of an asset allocation process which can be performed by the predictive cost optimization controller are described in detail in U.S. patent application Ser. No. 15/405,236, U.S. patent application Ser. No. 15/405,234, U.S. patent application Ser. No. 15/426,962, and U.S. patent application Ser. No. 15/473,496.

Distributed Model Predictive Control System

Figure 6:
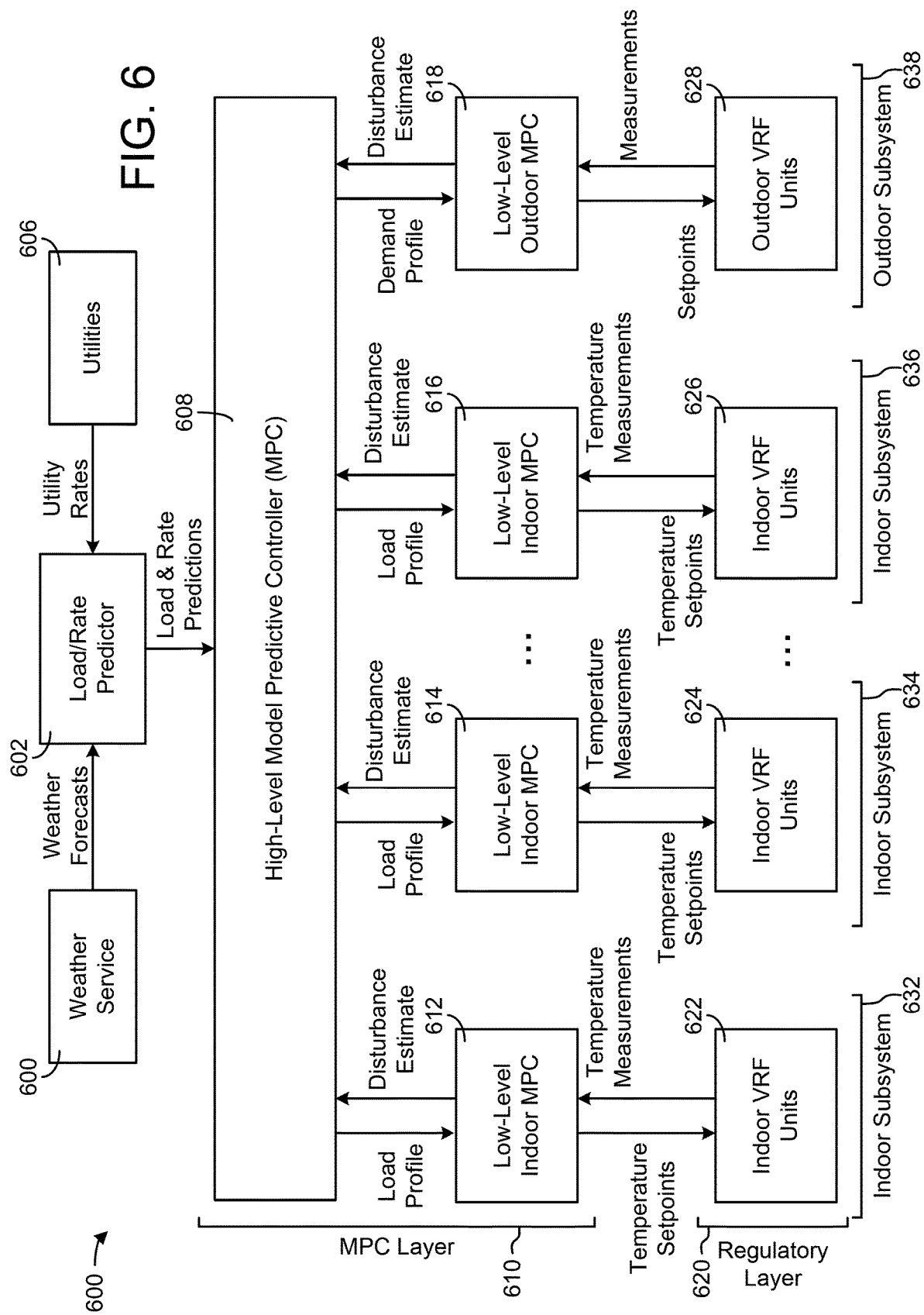
FIG. 6 is a block diagram of a distributed model predictive control system with a high-level model-predictive controller, several low-level indoor model predictive controllers, and a low-level outdoor model predictive controller, according to some embodiments.

Referring now to FIG. 6, a block diagram of a distributed model predictive control (MPC) system 600 is shown, according to some embodiments. MPC system 600 uses a MPC technique to determine optimal setpoints for the equipment of a VRF system (e.g., VRF system 100) over a time horizon. MPC system 600 can be used in combination with VRF system 100, as described with reference to FIGS. 1-5. For example, MPC system 600 can determine optimal temperature setpoints for indoor VRF units 104 and optimal load setpoints for outdoor VRF units 102.

MPC is a control technique that uses a model of a controlled system to relate system inputs (e.g., control actions, setpoints, etc.) to system states and system outputs (e.g., measurements, process variables, etc.). The model can be used to predict the system states and system outputs based on the actions taken by a controller at each time step during an optimization period. At each time step, MPC solves an online optimization problem using the system model to determine a sequence of control actions that achieve an objective (e.g., minimizing tracking error, minimizing energy cost, etc.) while respecting process constraints such as equipment capacity and safety bounds (e.g., temperature constraints, equipment switching constraints, etc.). The first control action in the sequence is implemented and the optimization problem is solved again at the next time step after new measurements are obtained.

In economic MPC, the objective in the optimization problem is often to minimize total cost, as defined by a cost function. Numerous studies have shown that MPC outperforms existing control systems due to its ability to forecast into the future and anticipate events before they occur. MPC enables shifting of the energy load from peak hours to off-peak hours by using the mass of the building for passive thermal energy storage (TES). Energy costs can be decreased by concentrating equipment usage to times of low resource prices, all while maintaining comfort limits within each building.

Still referring to FIG. 6, distributed MPC system 600 is shown to include a MPC layer 610 and a regulatory layer 620. MPC layer 610 is shown to include a high-level model predictive controller 608 and several low-level model predictive controllers 612-618. Controllers 612, 614, and 616 are shown as low-level indoor model predictive controllers, whereas controller 618 is shown as a low-level outdoor model predictive controller. MPC layer 610 can be configured to determine and provide optimal temperature setpoints and equipment operating setpoints to the equipment of regulatory layer 620. In some embodiments, MPC layer 610 can be retrofit to any existing VRF system to provide setpoint optimization for the equipment of the VRF system.

Regulatory layer 620 is shown to include indoor VRF units 622-626 and outdoor VRF units 628. Indoor VRF units 622-626 can include some or all of indoor VRF units 104, whereas outdoor VRF units 628 can include some or all of outdoor VRF units 102. In some embodiments, regulatory layer 620 can include PID controllers, operable equipment (e.g., outdoor VRF units, indoor VRF units, pumps, fans, valves, etc.), and/or other systems or devices configured to control a process variable to a setpoint.

In some embodiments, distributed MPC system 600 includes a load/rate predictor 602. Load/rate predictor 602 can provide MPC layer 610 with load and rate predictions including, for example, disturbance forecasts, electricity prices, demand charge prices, and outside air temperatures. Load/rate predictor 602 is shown receiving weather forecasts from a weather service 604. In some embodiments, load/rate predictor 602 generates the disturbance forecasts as a function of the weather forecasts. In some embodiments, load/rate predictor 602 uses feedback from regulatory layer 620 to generate the disturbance forecasts. Feedback from regulatory layer 620 can include various types of sensory inputs (e.g., temperature, flow, humidity, enthalpy, etc.) or other data relating to the controlled building or campus (e.g., building occupancy data, building electric load, etc.). In some embodiments, load/rate predictor 602 generates a disturbance forecast including a predicted disturbance value for each time step within the optimization period.

In some embodiments, load/rate predictor 602 uses a deterministic plus stochastic model trained from historical load data to generate the disturbance forecast. Load/rate predictor 602 can use any of a variety of prediction methods to generate the disturbance forecast (e.g., linear regression for the deterministic portion and an autoregressive model for the stochastic portion). Load/rate predictor 602 can predict one or more different types of disturbances for the building or campus. For example, load/rate predictor 602 can predict a thermal load resulting from heat transfer between the air within a building and the outside air through the walls of the building. Load/rate predictor 602 can predict a thermal load resulting from internal heat generation within the building (e.g., heat generated by electronics in the building, heat generated by building occupants, etc.). In some embodiments, load/rate predictor 602 makes load/rate predictions using the techniques described in U.S. patent application Ser. No. 14/717,593, titled "Building Management System for Forecasting Time Series Values of Building Variables" and filed May 20, 2015, the entire disclosure of which is incorporated by reference herein.

Load/rate predictor 602 is shown receiving utility rates from utilities 606. Utility rates can indicate a cost or price per unit of a resource (e.g., electricity, natural gas, water, etc.) provided by utilities 606 at each time step in the optimization period. In some embodiments, the utility rates are time-variable rates. For example, the price of electricity can be higher at certain times of day or days of the week (e.g., during high demand periods) and lower at other times of day or days of the week (e.g., during low demand periods). The utility rates can define various time periods and a cost per unit of a resource during each time period. Utility rates can be actual rates received from utilities 606 or predicted utility rates estimated by load/rate predictor 602.

In some embodiments, the utility rates include demand charges for one or more resources provided by utilities 606. A demand charge can define a separate cost imposed by utilities 606 based on the maximum usage of a particular resource (e.g., maximum energy consumption) during a demand charge period. The utility rates can define various demand charge periods and one or more demand charges associated with each demand charge period. In some instances, demand charge periods can overlap partially or completely with each other and/or with the optimization period. Advantageously, MPC layer 610 can account for demand charges in the high-level optimization process performed by high-level model predictive controller 608. Utilities 606 can be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 602 can store the predicted loads and the utility rates in memory and/or provide the predicted loads and the utility rates to high-level MPC 608.

MPC layer 610 can receive measurements from regulatory layer 620 and provide setpoints to regulatory layer 620. MPC layer 610 can generate optimal values for various decision variables including, for example, zone temperature setpoints, variable refrigerant flow setpoints, operating mode setpoints (e.g., heating or cooling), and/or equipment on/off decisions. MPC layer 610 can determine the optimal values of the decision variables using system models such a zone temperature to cooling/heating duty model, a cooling/heating duty to temperature setpoint model, and equipment models. MPC layer 610 can determine the optimal values of the decision variables by performing an optimization process subject to several constraints. The constraints can include comfort bounds on the zone air temperatures, equipment capacity constraints, refrigerant state balance constraints, and rate of change bounds on the equipment of regulatory layer 620.

As discussed above, solving a single MPC problem to determine the optimal values of the decision variables can be difficult for large-scale applications. For example, a building or building system can include thousands of discrete zones and thousands of unique HVAC devices. The discrete decisions (e.g., turning equipment on/off) can result in a mixed integer optimization problem, which further increases complexity. Due to the difficulty and computational complexity of the MPC problem, MPC layer 610 can decompose the overall MPC problem into smaller, more manageable, optimization problems.

As shown in FIG. 6, distributed MPC system 600 can decompose the overall MPC problem into a high-level optimization problem and a low-level optimization problem. The high-level problem can be solved by high-level controller 608 to determine a load profile for each indoor subsystem 632-636 and a demand profile for outdoor subsystem 638. In some embodiments, high-level controller 608 uses aggregate low-level models for each indoor subsystem 632-636 to reduce computational complexity. High-level controller 608 can determine load profiles that optimize (e.g., minimize) the total operational cost of MPC system 600 over the optimization period. Each load profile can include a load value for each time step in the optimization period. Low-level indoor controllers 612-616 can use the load profiles as constraints defining maximum permissible load values for each indoor subsystem 632-636 for each time step in the optimization period. High-level controller 608 can provide the load profiles to each of the low-level indoor controller 612-616. The high-level optimization performed by high-level controller 608 is described in greater detail with reference to FIG. 7.

The low-level optimization problem can be further decomposed into a low-level outdoor optimization problem and one or more low-level indoor optimization problems. Each low-level indoor problem can be solved by one of low-level indoor controllers 612-616 to determine zone temperature setpoints for the indoor VRF units 622-626 of each indoor subsystem 632-636. Each low-level indoor controller 612-616 can determine the zone temperature setpoints that optimize (e.g., minimize) the energy consumption of the corresponding indoor subsystem 632-636 while maintaining zone temperatures within defined temperature limits and without exceeding the load values provided by high-level controller 608. Alternatively, each low-level indoor controller 612-616 can determine temperature setpoints that track the average indoor subsystem temperatures (e.g., predicted subsystem temperature states) from the high-level optimization problem. The low-level optimization performed by low-level controllers 612-616 is described in greater detail with reference to FIG. 8.

The low-level outdoor problem can be solved by low-level outdoor controller 618. In some embodiments, the low-level outdoor problem is a mixed-integer linear program. Low-level outdoor controller 618 can determine optimal setpoints for outdoor VRF units 628 that minimize operating cost while meeting the demand profile from high-level controller 608. Decision variables optimized by low-level outdoor controller 618 can include, for example, equipment on/off states, thermal loads for chillers, compressor setpoints, flow rates for pumps, and setpoints for other auxiliary outdoor equipment. Low-level outdoor controller 618 can use the demand profile from high-level controller 608 as an input specifying the overall demand to be met by outdoor VRF units 628 at each time step of the optimization period.

In some embodiments, low-level outdoor controller 618 decomposes the low-level outdoor optimization problem into a first outdoor optimization problem and a second outdoor optimization problem. The first outdoor optimization problem can allocate the demand specified by high-level controller 608 across multiple outdoor VRF units of the outdoor subsystem. The second outdoor optimization problem can be decomposed into a mixed-integer optimization problem for each subplant to determine optimal equipment on/off states and equipment setpoints for outdoor VRF units 628. An example of an optimization technique which can be used by low-level outdoor controller 618 is described in detail in U.S. patent application Ser. No. 14/634,609 filed Feb. 27, 2015, the entire disclosure of which is incorporated by reference herein.

As shown in FIG. 6, each low-level indoor model predictive controller 612-616 can control a subsystem 632-636 of the entire VRF system 100. Each low-level indoor controller 612-616 can perform a separate indoor optimization process to determine optimal temperature setpoints for the indoor VRF units 622-626 of the corresponding indoor subsystem 632-636. Each indoor subsystem 632-636 can include one or more indoor VRF units, each of which can be configured to deliver air to one or more building zones.

In some embodiments, high-level controller 608 uses an aggregate model of each indoor subsystem 632-636 and allocates a thermal energy load to each indoor subsystem 632-636. Low-level indoor controllers 612-616 can use more detailed zone-level models during the low-level optimization processes to determine the optimal temperature setpoints for each building zone of the corresponding indoor subsystem. Decomposing the VRF system 100 into separate indoor subsystems 632-636 can improve computational performance and substantially decrease the amount of time required to solve the low-level MPC problems. For example, all of the low-level MPC problems can be solved within a few minutes.

In some embodiments, each indoor subsystem 632-636 represents a separate building. Significant coupling between indoor subsystems 632-636 (e.g., heat exchange between subsystems 632-636) can affect performance since low-level controllers 612-616 are not required to coordinate their solutions. One way to decompose VRF system 100 to guarantee that there is no coupling between subsystems 632-636 is to decompose by building since separate buildings do not exchange heat with one another. For this reason, it may be desirable to select indoor subsystems 632-636 so that each indoor subsystem 632-636 represents a separate building. Each indoor subsystem 632-636 can include multiple zones (e.g., rooms or spaces within the building), each of which can be controlled by a separate indoor VRF unit. In other embodiments, each indoor subsystem 632-636 can represent a single building zone, a collection of zones within a building, or even multiple buildings.

In MPC system 600, high-level model predictive controller 608 determines the thermal energy loads to allocate to each indoor subsystem 632-636 (e.g., each building or each zone) and the demand profile for outdoor subsystem 638. Each indoor subsystem 632-636 can include a separate low-level indoor controller 612-616 that computes the temperature setpoints or variable refrigerant flow rates for each zone in that indoor subsystem 632-636 (e.g., setpoints for each indoor VRF unit in the building). The low-level indoor problem can be solved in a distributed manner. The low-level indoor problem can be easily extended to handle large industrial and campus-wide implementations without increasing computational complexity.

Distributed MPC system 600 provides several advantages over alternative control strategies. For example, high-level controller 608 can coordinate operation low-level indoor subsystems 632-636 via the load profiles provided to each low-level controller 612-616. By including a demand charge in the high-level objective function, high-level controller 608 can generate load profiles which stager the operation of low-level indoor subsystems 632-636. In other words, high-level controller 608 can generate load profiles which ensure that low-level indoor subsystems 632-636 do not all consume power at the same time. This allows high-level controller 608 to coordinate operation of low-level indoor subsystems 632-636 and account for the demand charge without requiring communication between low-level indoor controllers 612-616. The coupling caused by the presence of a single outdoor subsystem 638 for all indoor subsystems 632-636 is also addressed by high-level controller 608. Hence, the low-level control problems are completely decoupled such that iterations and communication between low-level controllers 612-616 are not required.

Data communication between MPC layer 610 and regulatory layer 620 can also be greatly reduced. For example, data communication between MPC layer 610 and regulatory layer 620 can be limited to measurements and setpoints, as shown in FIG. 6. This allows MPC system 600 to be integrated with any existing BMS. High level controller 608 can use aggregate models of each indoor subsystem 632-636 and outdoor subsystem 638 to reduce computational complexity during the high-level optimization. Each low-level indoor controller 612-616 can provide high-level controller 608 with an aggregate disturbance estimate, an aggregate temperature, and aggregate system parameters (e.g., thermal capacitance, heat transfer coefficient, etc.) for the corresponding indoor subsystem 632-636.

Distributed MPC system 600 can be used to control a variety of different systems including, for example, a chiller plant, air handling units, rooftop units, variable refrigerant flow systems, airside systems, waterside systems, building management systems, and/or other types of systems for which power consumption or thermal energy loads can be allocated to different subsystems. Most building temperature regulation methods do not consider detailed models of VRF equipment or integer decision variables, which decreases the fidelity of energy cost calculations. However, MPC system 600 can include integer variables in the optimization problem to determine when to turn equipment on and off rather than relying on heuristics.

High-Level Model Predictive Controller

Figure 7:
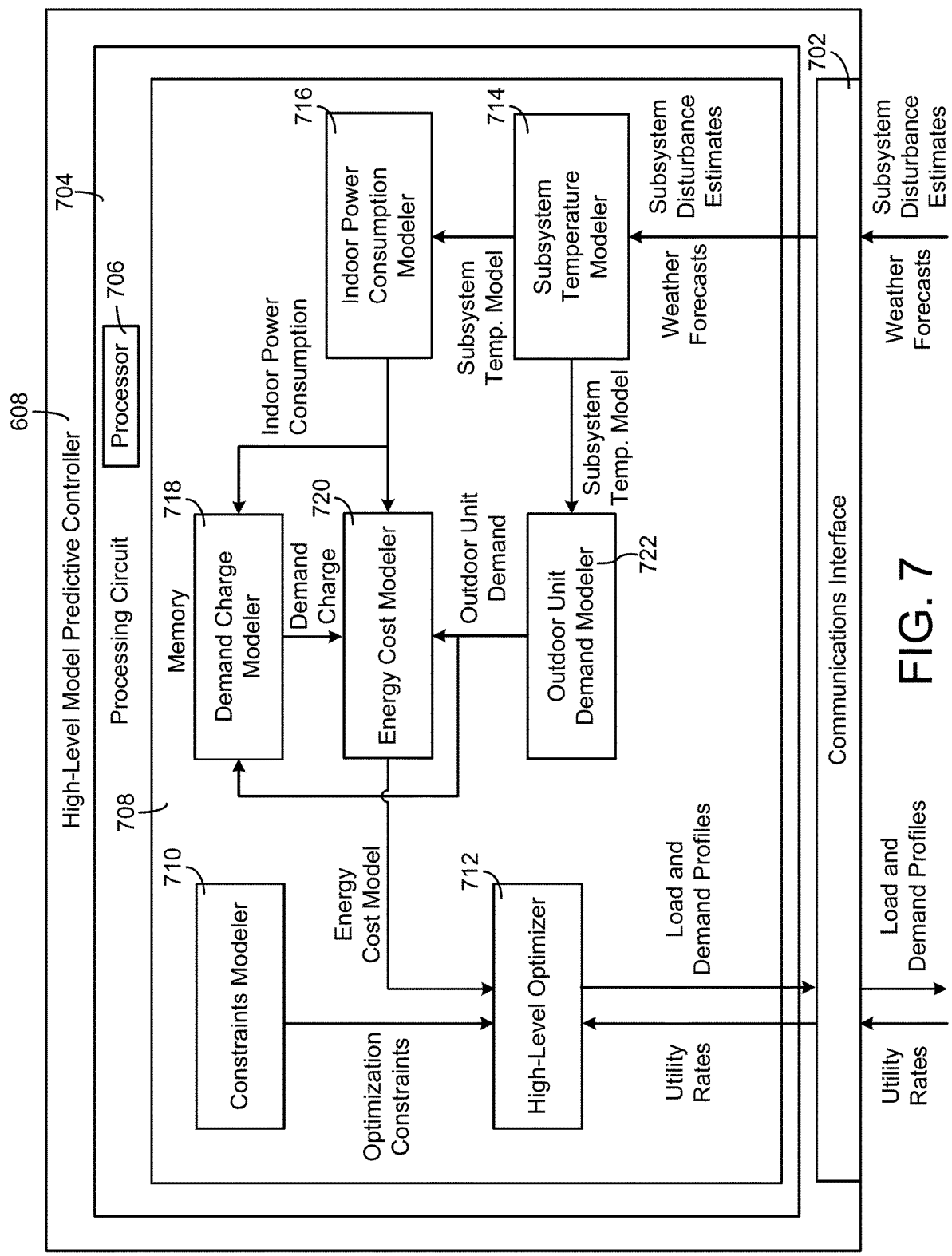
FIG. 7 is a block diagram illustrating the high-level model predictive controller of FIG. 6 in greater detail, according to some embodiments.

Referring now to FIG. 7, a block diagram illustrating high-level model predictive controller (MPC) 608 in greater detail is shown, according to some embodiments. High-level MPC 608 is shown a communications interface 702 and a processing circuit 704. Communications interface 702 can include wired or wireless interfaces (e.g., jacks, antennas, transmitters, receivers, transceivers, wire terminals, etc.) for conducting data communications with various systems, devices, or networks. For example, communications interface 702 can include an Ethernet card and port for sending and receiving data via an Ethernet-based communications network and/or a WiFi transceiver for communicating via a wireless communications network. Communications interface 702 can be configured to communicate via local area networks or wide area networks (e.g., the Internet, a building WAN, etc.) and may use a variety of communications protocols (e.g., BACnet, IP, LON, etc.).

Communications interface 702 can be a network interface configured to facilitate electronic data communications between high-level MPC 608 and various external systems or devices (e.g., weather service 604, utilities 606, low-level controllers 612-618, BMS equipment, etc.). For example, high-level MPC 608 can receive weather forecasts from weather service 604, utility rates from utilities 606, and/or load and rate predictions from load/rate predictor 602. High-level MPC 608 can receive measurements from the BMS indicating one or more measured states of the controlled building or campus (e.g., temperature, humidity, electric loads, etc.) and one or more states of outdoor subsystem 638 (e.g., equipment status, power consumption, equipment availability, etc.).

High-level MPC 608 can receive indoor subsystem disturbance estimates from each low-level indoor controller 612-616. The indoor subsystem disturbance estimates can indicate an estimated thermal energy load for each indoor subsystem 632-636. High-level MPC 608 can receive aggregate system curves, aggregate subsystem parameters, and/or coefficients of performance from each low-level controller 612-618. High-level MPC 608 can use the information received at communications interface 702 to generate load profiles for each indoor subsystem 632-636 and a demand profile for outdoor subsystem 638. High-level MPC 608 can provide the load profiles and the demand profile to low-level controllers 612-618.

Processing circuit 704 is shown to include a processor 706 and memory 708. Processor 706 can be a general purpose or specific purpose processor, an application specific integrated circuit (ASIC), one or more field programmable gate arrays (FPGAs), a group of processing components, or other suitable processing components. Processor 706 can be configured to execute computer code or instructions stored in memory 708 or received from other computer readable media (e.g., CDROM, network storage, a remote server, etc.).

Memory 708 can include one or more devices (e.g., memory units, memory devices, storage devices, etc.) for storing data and/or computer code for completing and/or facilitating the various processes described in the present disclosure. Memory 708 can include random access memory (RAM), read-only memory (ROM), hard drive storage, temporary storage, non-volatile memory, flash memory, optical memory, or any other suitable memory for storing software objects and/or computer instructions. Memory 708 can include database components, object code components, script components, or any other type of information structure for supporting the various activities and information structures described in the present disclosure. Memory 708 can be communicably connected to processor 706 via processing circuit 704 and can include computer code for executing (e.g., by processor 706) one or more processes described herein. When processor 706 executes instructions stored in memory 708, processor 706 generally configures high-level MPC 608 (and more particularly processing circuit 704) to complete such activities.

Still referring to FIG. 7, high-level MPC 608 is shown to include a subsystem temperature modeler 714. Subsystem temperature modeler 714 can generate a temperature model for each indoor subsystem 632-636. The temperature models generated by subsystem temperature modeler 714 can be referred to as building temperature models under the assumption that each indoor subsystem 632-636 represents a separate building. However, the temperature models generated by subsystem temperature modeler 714 can be temperature models for other types of subsystems if indoor subsystems 632-636 represent other types of spaces. Subsystem temperature modeler 714 can generate a temperature model for each indoor subsystem. Although only three indoor subsystems 632-636 are shown in FIG. 6, it should be understood that any number of buildings and indoor subsystems 632-636 may be present. In general, subsystem temperature modeler 714 can generate $n_b$ indoor subsystem temperature models, where $n_b$ is the total number of buildings and/or indoor subsystems 632-636.

In some embodiments, subsystem temperature modeler 714 models the temperature of each indoor subsystem using a building heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by subsystem temperature modeler 714 include the following air and mass zone models:

$$C_z \frac{dT_z}{dt} = H_{az}(T_a - T_z) + H_{mz}(T_m - T_z) - \dot{Q}_c + \dot{Q}_{other}$$

$$C_m \frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by subsystem temperature modeler 714 include the following air, shallow mass, and deep mass zone models:

$$C_z \frac{dT_z}{dt} = H_{az}(T_a - T_z) + H_{sz}(T_s - T_z) - \dot{Q}_c + \dot{Q}_{other}$$

$$C_s \frac{dT_s}{dt} = H_{sz}(T_z - T_s) + H_{ds}(T_d - T_s)$$

$$C_d \frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, subsystem temperature modeler 714 models the temperature of each indoor subsystem using the following subsystem temperature model:

$$C_b \frac{dT_b}{dt} = -H_b(T_b - T_a) - \dot{Q}_{c,b} + \dot{Q}_{other,b}$$

where $C_b$ and $T_b$ are the thermal capacitance and temperature of the indoor subsystem designated by index b, $T_a$ is the ambient air temperature outside indoor subsystem b (e.g., outside air temperature), $H_b$ is the heat transfer coefficient between indoor subsystem b and the ambient air, $\dot{Q}_{c,b}$ is the amount of cooling applied to the indoor subsystem by MPC system 600 (i.e., the amount of heat removed from the indoor subsystem), and $\dot{Q}_{other,b}$ is the external load, radiation, or disturbance experienced by indoor subsystem b. If heating is provided to the indoor subsystem rather than cooling, the sign on $\dot{Q}_{c,b}$ can be switched from a negative sign to a positive sign.

Subsystem temperature modeler 714 can use the indoor subsystem disturbance estimates received from low-level indoor controllers 612-616 to identify appropriate values of the external disturbance $\dot{Q}_{other,b}$ for each indoor subsystem b at each time step of the optimization period. In some embodiments, subsystem temperature modeler 714 uses the weather forecasts from weather service 604 and/or the load and rate predictions provided by load/rate predictor 602 to determine appropriate values for the ambient air temperature $T_a$ and/or the external disturbance $\dot{Q}_{other,b}$ for each indoor subsystem b at each time step of the optimization period. Values of $C_b$ and $H_b$ can be specified as parameters of the indoor subsystem b, received from the low-level indoor controller for the indoor subsystem b, received from a user, retrieved from memory 708, or otherwise provided to subsystem temperature modeler 714. Subsystem temperature modeler 714 can generate a indoor subsystem temperature model for each indoor subsystem b, where b=1 . . . $n_b$ and $n_b$ is the total number of indoor subsystems.

High level MPC 608 is shown to include an outdoor unit demand modeler 722. Outdoor unit demand modeler 722 can generate a model representing the demand on outdoor subsystem 638 as a function of the thermal energy load $\dot{Q}_{c,b}$ allocated to each indoor subsystem b at each time step of the optimization period. In some embodiments, outdoor unit demand modeler 722 uses the following equation to model outdoor unit demand:

$$\dot{Q}_{HVAC,k} = \sum_{b=1}^{b_n} \dot{Q}_{c,b,k}$$

where $\dot{Q}_{HVAC,k}$ is the outdoor unit demand at time step k (e.g., the thermal energy or refrigerant state allocation of outdoor subsystem 638 at time step k) and $\dot{Q}_{c,b,k}$ is the thermal energy load allocated to indoor subsystem b at time step k. The previous equation indicates that the total demand $\dot{Q}_{HVAC,k}$ on the outdoor subsystem 638 is a summation of the thermal energy loads $\dot{Q}_{c,b,k}$ allocated to each indoor subsystem b. This equation can be used by high level MPC 608 as an energy balance constraint to ensure that outdoor subsystem 638 generates enough thermal energy to cover the indoor subsystem at each time step k.

High level MPC 608 is shown to include a constraints modeler 710. Constraints modeler 710 can generate and impose optimization constraints on the optimization procedure performed by high-level optimizer 712. Constraints imposed by constraints modeler 710 can include, for example, equipment capacity constraints and indoor subsystem temperature constraints. In some embodiments, constraints modeler 710 imposes the following constraint:

$$\dot{Q}_{HVAC,k} \leq \dot{Q}_{HVAC,max}$$

to ensure that the outdoor unit demand $\dot{Q}_{HVAC,k}$ at each time step k is less than or equal to the maximum capacity $\dot{Q}_{HVAC,max}$ of outdoor subsystem 638.

In some embodiments, constraints modeler 710 imposes constraints on the indoor subsystem temperature $T_b$. For example, constraints modeler 710 can constrain the indoor subsystem temperature $T_b$ between a minimum temperature $T_{min}$ and a maximum temperature $T_{max}$ as shown in the following equation:

$$T_{min} \leq T_b \leq T_{max}$$

where the values of $T_{min}$ and $T_{max}$ can be adjusted based on the temperature setpoints of the indoor subsystem. In some embodiments, constraints modeler 710 automatically adjusts the values of $T_{min}$ and $T_{max}$ based on information received from the low-level indoor controller and/or BMS for the indoor subsystem. For example, constraints modeler 710 can use a temperature setpoint schedule and/or occupancy schedule for the indoor subsystem to automatically adjust the values of $T_{min}$ and $T_{max}$ for each time step k. This allows constraints modeler 710 to use temperature limits based on the time-varying setpoint temperature range for the indoor subsystem so that the indoor subsystem temperature $T_b$ is maintained within time-appropriate temperature limits $T_{min}$ and $T_{max}$.

Still referring to FIG. 7, high-level MPC 608 is shown to include an energy cost modeler 720 and a demand charge modeler 718. Energy cost modeler 720 can generate an energy cost model representing the cost of energy consumed by MPC system 600. The cost of energy can include both a per-unit cost of energy resources (e.g., electricity, water, natural gas, etc.) consumed by MPC system 600 during the optimization period and a demand charge based on the maximum power consumption. The demand charge component of the energy cost model can be modeled by demand charge modeler 718 and enforced via demand charge constraints. In some embodiments, the energy cost model accounts for only the energy resources consumed by outdoor subsystem 638. In other embodiments, the energy cost model also accounts for the power consumption of indoor subsystems 622-626, which can be modeled by indoor power consumption modeler 716. Examples of both scenarios are described below.

Example 1: Energy Cost Model without Indoor Power Consumption

In some embodiments, energy cost modeler 720 generates an energy cost model that accounts for the energy consumption of outdoor subsystem 638 without including indoor power consumption. For example, energy cost modeler 720 can model total energy cost during the optimization period using the following equation:

$$\sum_{k=0}^{N-1} c_k \eta_{tot} \dot{Q}_{HVAC,k} \Delta + c_{peak} \eta_{tot} \dot{Q}_{peak}$$

The first term of the energy cost model accounts for the per unit costs (e.g., \$/kWh) of energy consumed during each time step k of the optimization period. In some embodiments, $c_k$ is the cost per unit of energy consumed at time step k to satisfy the total outdoor unit demand $\dot{Q}_{HVAC,k}$ at time step k, the parameter $\eta_{tot}$ is the inverse of the coefficient of performance of the aggregate VRF subsystem (e.g., $0.1 \leq \eta_{tot} \leq 0.25$), and $\Delta$ is the duration of time step k. Accordingly, the term $\eta_{tot}\dot{Q}_{HVAC,k}\Delta$ represents the total amount of energy consumed (e.g., kWh) during time step k to satisfy the outdoor unit demand $\dot{Q}_{HVAC,k}$. Multiplying by the cost $c_k$ per unit energy consumed (e.g., $/kWh) yields the total cost (e.g., $) of the energy consumed during time step k. The energy cost model can include a summation of the energy costs during each time step k to determine the total cost of energy consumption over the optimization period.

The second term of the energy cost model accounts for the demand charge. In some embodiments, $c_{peak}$ is the demand charge rate (e.g., $/kW), $\dot{Q}_{peak}$ is the peak outdoor unit demand during the demand charge period (e.g., the maximum of $\dot{Q}_{HVAC,k}$), and $\eta_{tot}$ is the inverse of the coefficient of performance of the aggregate VRF subsystem. Accordingly, the term $\eta_{tot}\dot{Q}_{peak}$ represents the peak power consumption to satisfy the peak outdoor unit demand $\dot{Q}_{peak}$. Multiplying by the demand charge rate $c_{peak}$ yields the total cost (e.g., $) of the demand charge.

In some embodiments, demand charge modeler 718 generates demand charge constraints to ensure that $\dot{Q}_{peak}$ has the appropriate value. If the demand charge period is contained entirely within the optimization period (e.g., between time steps k=0 and k=N−1), then the appropriate value of $\dot{Q}_{peak}$ is simply the maximum of $\dot{Q}_{HVAC,k}$ during the optimization period. Demand charge modeler 718 can implement the following demand charge constraint:

$$0 \leq \dot{Q}_{HVAC,k} \leq \dot{Q}_{peak}$$

to ensure that the peak outdoor unit demand $\dot{Q}_{peak}$ is always greater than or equal to the outdoor unit demand $\dot{Q}_{HVAC,k}$ at each time step. This forces the peak outdoor unit demand $\dot{Q}_{peak}$ to be at least as large as the maximum outdoor unit demand during the optimization period.

If the demand charge period begins before the optimization period, it is possible that the maximum value of $\dot{Q}_{HVAC,k}$ during the demand charge period occurred prior to the beginning of the optimization period. Demand charge modeler 718 can implement the following demand charge constraint:

$$\dot{Q}_{peak,past} \leq \dot{Q}_{peak}$$

to ensure that the peak outdoor unit demand $\dot{Q}_{peak}$ is always greater than or equal to the maximum outdoor unit demand $\dot{Q}_{peak,past}$ that occurred during the same demand charge period, even if the maximum outdoor unit demand occurred prior to the beginning of the current optimization period. In some embodiments, demand charge modeler 718 updates $\dot{Q}_{peak,past}$ each time a new maximum outdoor unit demand is set to ensure that the energy cost model accurately represents the demand charge imposed by the power utility.

High-level optimizer 712 can use the energy cost model, demand charge model, indoor subsystem temperature model, outdoor unit demand model, and optimization constraints to formulate an optimization problem. In some embodiments, high-level optimizer 712 seeks to minimize the total cost of energy consumed by outdoor subsystem 638 (i.e., energy cost and demand charge) subject to the indoor subsystem temperature constraints and other constraints provided by the high-level models described herein. For example, high-level optimizer 712 can formulate the high-level optimization problem as:

$$\min_{x,u,\dot{Q}_{peak}} \sum_{k=0}^{N-1} c_k \eta_{tot} \dot{Q}_{HVAC,k}\Delta + c_{peak}\eta_{tot}\dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\dot{Q}_{HVAC,k} = \sum_{b=1}^{b_n} \dot{Q}_{c,b,k}$$

$$0 \leq \dot{Q}_{HVAC,k} \leq \dot{Q}_{peak}$$

$$\dot{Q}_{peak,past} \leq \dot{Q}_{peak} \leq \dot{Q}_{HVAC,max}$$

$$T_{min} \leq T_b \leq T_{max}$$

and any refrigerant balance constraints needed to ensure that the amount of refrigerant in each state (e.g., liquid, gas, superheated gas, etc.) remains balanced at each time step k.

In some embodiments, high-level optimizer 712 converts one or more of the above-identified models and/or constraints to state-space form for use in the high-level optimization problem. For example, high-level optimizer 712 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 1 illustrates the variables that can be included in each of these vectors:

TABLE 1

| Variables in High-Level Optimization | | |
|---|---|---|
| States | $x = [T_b]^T$ | $n = n_b$ |
| Inputs | $u = [\dot{Q}_{c,b}]^T$ | $m = n_b$ |
| Measurements | $y = [T_b]^T$ | $p = n_b$ |
| Disturbances | $d = [T_a \ \dot{Q}_{other,b}]^T$ | $n_d = n_b + 1$ |

As shown in Table 1, the system states vector x includes the indoor subsystem temperature $T_b$. In some embodiments, the system states vector x includes a indoor subsystem temperature $T_b$ for each of the $n_b$ indoor subsystems such that the total number n of variables in the system states vector x is equal to $n_b$. The inputs vector u can include the thermal energy load $\dot{Q}_{c,b}$ allocated to each indoor subsystem b. In some embodiments, the inputs vector u includes a thermal energy load $\dot{Q}_{c,b}$ for each of the $n_b$ indoor subsystems such that the total number m of variables in the inputs vector u is equal to $n_b$. The disturbance vector d can include the ambient air temperature $T_a$ and the estimated disturbance $\dot{Q}_{other,b}$ for each indoor subsystem. In some embodiments, the disturbances vector d includes an estimated disturbance $\dot{Q}_{other,b}$ for each of the $n_b$ indoor subsystems and a single ambient air temperature $T_a$ such that the total number $n_d$ of variables in the disturbances vector d is equal to $n_b+1$.

In some embodiments, the measurements vector y is the same as the system states vector x. This indicates that all of the system states are directly measured (i.e., $y_k = x_k$) and the values of the C and D matrices in the state-space model are C=I and D=0. In other embodiments, the system states x can be constructed or predicted from the measurements y. For example, high-level MPC 608 can use a Kalman filter or other predictive technique to construct the system states x from the measurements y. Accordingly, the system states x can be replaced with $\hat{T}_b$, where the hat notation indicates that such states are predicted. The values of the A, B, C, and D, matrices in the state-space representation can be identified using a system identification technique. Examples of state prediction and system identification techniques which can be used by high-level MPC 608 are described in detail in U.S. Pat. No. 9,235,657 titled "System Identification and Model Development" and filed Mar. 13, 2013, the entire disclosure of which is incorporated by reference herein.

Example 2: Energy Cost Model with Indoor Power Consumption

In some embodiments, energy cost modeler 720 generates an energy cost model that accounts for both the energy consumption of outdoor subsystem 638 and the energy consumption of indoor subsystems 622-626. For example, the energy cost model can account for the power $\dot{W}_{air,b}$ consumed by fans and other types of equipment in indoor VRF units 622-626 to deliver the allocated thermal energy load $\dot{Q}_{c,b}$ to the indoor subsystem. In some embodiments, the power consumption $\dot{W}_{air,b}$ of each indoor subsystem 632-636 is a function of the thermal energy load $\dot{Q}_{c,b}$ allocated to that indoor subsystem.

Indoor power consumption modeler 716 can generate an indoor power consumption model which relates indoor power consumption $\dot{W}_{air,b}$ to thermal energy load $\dot{Q}_{c,b}$. In some embodiments, indoor power consumption modeler 716 models indoor power consumption using the following equation:

$$\dot{W}_{air,b} = \eta_{air} \dot{Q}_{c,b}$$

where $\dot{W}_{air,b}$ is the amount of power consumed by the indoor VRF units 622 of indoor subsystem b to deliver the thermal energy load $\dot{Q}_{c,b}$. The conversion factor $\eta_{air}$ can be a function of the coefficient of performance of the indoor VRF units 622 (e.g., an inverse of the coefficient of performance). In some embodiments, $\dot{W}_{air}$ is a constant, which indicates that the relationship between indoor power consumption $\dot{W}_{air,b}$ and thermal energy load $\dot{Q}_{c,b}$ is linear. In other embodiments, $\eta_{air}$ can be calculated by indoor power consumption modeler 716 as a nonlinear function of load and other parameters using operating data.

In some embodiments, indoor power consumption modeler 716 calculates the conversion factor $\eta_{air}$ as a function of various system parameters such as the type of indoor VRF unit in the indoor subsystem, the time of day, comfort bounds, ambient conditions, chilled water supply temperature, chilled water supply flow rate, and/or other parameters that characterize indoor subsystems 632-636 or any of the indoor subsystems 632-636. For example, indoor power consumption modeler 716 can collect operating data from indoor VRF units 622 and/or low-level indoor controller 612 and use the operating data to determine an appropriate value of $\eta_{air}$.

In some embodiments, indoor power consumption modeler 716 calculates $\eta_{air}$ as a function of the thermal energy load $\dot{Q}_c$ and individual fan power models. For example, air at 20° C. can have a density $\rho_{air}$ and heat capacity $C_{p,air}$ as shown in the following equations:

$$\rho_{air} = 1.205 \frac{kg}{m^3} \quad C_{p,air} = 1.005 \frac{kJ}{kg \cdot K}$$

The thermal energy load $\dot{Q}_c$ provided by an airflow can be represented using the following model:

$$\dot{Q}_c = \dot{m}_{air} C_{p,air} \Delta T$$

$$\dot{Q}_c = \rho_{air} \dot{V}_{air} C_{p,air} (T_{room} - T_{supply})$$

$$\frac{\dot{Q}_c}{\dot{V}_{air}} = \rho_{air} C_{p,air} (T_{room} - T_{supply})$$

where $\dot{V}_{air}$ is the volumetric flow rate of supply air into a building zone, $T_{room}$ is the temperature of the building zone, and $T_{supply}$ is the temperature of the supply air. Assuming that the supply air temperature $T_{supply}$ is approximately 55° F. and the room air temperature $T_{room}$ is approximately 72° F., indoor power consumption modeler 716 can calculate the thermal energy load per unit volume of airflow (e.g., the cooling capacity of the air) as follows:

$$\frac{\dot{Q}_c}{\dot{V}_{air}} = \left(1.205 \frac{kg}{m^3}\right)\left(1.005 \frac{kJ}{kg \cdot K}\right)(72° F. - 55° F.)\left(\frac{5 K}{9° F.}\right)$$

$$\frac{\dot{Q}_c}{\dot{V}_{air}} = 11.437 \frac{kJ}{m^3}$$

Indoor power consumption modeler 716 can use this value of cooling capacity $\dot{Q}_c/\dot{V}_{air}$ and the estimated power consumption per unit volume of a typical indoor VRF unit fan to estimate the value of $\eta_{air}$. For example, typical HVAC fans consume approximately 1 horsepower (hp) to provide between 1000 cubic feet per minute (CFM) and 1500 CFM of airflow. These values can be converted to metric values as follows:

$$\left(\frac{1 \text{ hp}}{1000 \text{ CFM} - 1500 \text{ CFM}}\right)\left(\frac{2118.9 \text{ CFM}}{1 \text{ m}^3/\text{s}}\right)\left(\frac{0.7457 \text{ kW}}{\text{hp}}\right) =$$

$$1.05 \frac{kJ}{m^3} - 1.58 \frac{kJ}{m^3}$$

Substituting these values into the indoor power consumption model yields:

$$\frac{\dot{W}_{air}}{\dot{V}_{air}} = \eta_{air} \frac{\dot{Q}_c}{\dot{V}_{air}}$$

$$1.05 \frac{kJ}{m^3} - 1.58 \frac{kJ}{m^3} = \eta_{air} 11.437 \frac{kJ}{m^3}$$

$$\eta_{air} = 0.091 - 0.14$$

which indicates that the indoor power consumption $\dot{W}_{air,b}$ of each indoor subsystem 632-636 is approximately 10% of the thermal energy load $\dot{Q}_{c,b}$ delivered by the indoor subsystem.

Given that indoor power consumption $\dot{W}_{air,b}$ can be modeled as $\eta_{air} \dot{Q}_{c,b}$, energy cost modeler 720 can model total energy cost during the optimization period using the following equation:

$$\sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

The first portion of the energy cost model accounts for the per unit costs (e.g., $/kWh) of energy consumed by outdoor subsystem 638 during each time step k of the optimization period. In some embodiments, $c_k$ is the cost per unit of energy consumed at time step k, $\Delta$ is the duration of time step k, and $\eta_{HVAC}$ is the inverse of the coefficient of performance of outdoor subsystem 638 (e.g., $\eta_{HVAC} \sim 0.2$). The term $\eta_{HVAC} \dot{Q}_{HVAC,k}$ represents the amount of power consumption (e.g., kW) by outdoor subsystem 638 during time step k to satisfy the outdoor unit demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by outdoor subsystem 638. The first portion of the energy cost model can be summed across all time steps k=0 ... N−1 of the optimization period to determine the total energy consumed by outdoor subsystem 638 over the duration of the optimization period.

The second portion of the energy cost model accounts for the per unit costs (e.g., $/kWh) of energy consumed by each indoor subsystem during each time step k of the optimization period. As described above, $\eta_{air}$ is the inverse of the coefficient of performance of the indoor subsystems (e.g., $\eta_{air} \sim 0.1$) and $\dot{Q}_{c,b,k}$ is the thermal energy load delivered by the indoor subsystem b at time step k. The term $\eta_{air} \dot{Q}_{c,b,k}$ represents the power consumption $\dot{W}_{air,b}$ of the indoor VRF units for subsystem b. The second portion of the energy cost model can be summed across all indoor subsystems b=1 . . . $n_b$ and across all time steps k=0 . . . N−1 to determine the total power consumption of all indoor subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the indoor subsystems over the duration of the optimization period.

The third portion of the energy cost model accounts for the demand charge. In some embodiments, $c_{peak}$ is the demand charge rate (e.g., $/kW) and $\dot{W}_{peak}$ is the peak aggregate indoor and outdoor power consumption during the applicable demand charge period. Multiplying by the demand charge rate $c_{peak}$ yields the total cost (e.g., $) of the demand charge. In some embodiments, demand charge modeler 718 generates demand charge constraints to ensure that $\dot{W}_{peak}$ has the appropriate value. If the demand charge period is contained entirely within the optimization period (e.g., between time steps k=0 and k=N−1), then the appropriate value of $\dot{W}_{peak}$ is the maximum of the combined indoor/outdoor power consumption at any time step k during the optimization period. Demand charge modeler 718 can implement the following demand charge constraint:

$$0 \le \left( \eta_{HVAC} \dot{Q}_{HVAC,k} + \eta_{air} \sum_{b=1}^{n_b} \dot{Q}_{c,b,k} \right) \le \dot{W}_{peak}$$

to ensure that the peak power consumption $\dot{W}_{peak}$ is always greater than or equal to the sum of the outdoor power consumption $\eta_{HVAC} \dot{Q}_{HVAC,k}$ and the indoor power consumption $\eta_{air} \Sigma_{b=1}^{n_b} \dot{Q}_{c,b,k}$ at each time step. This forces the peak power consumption $\dot{W}_{peak}$ to be at least as large as the maximum combined indoor/outdoor power consumption during the optimization period.

If the demand charge period begins before the optimization period, it is possible that the maximum peak power consumption during the demand charge period occurred prior to the beginning of the optimization period. Demand charge modeler 718 can implement the following demand charge constraint:

$$\dot{W}_{peak,past} \le \dot{W}_{peak}$$

to ensure that the peak power consumption $\dot{W}_{peak}$ is always greater than or equal to the maximum power consumption $\dot{W}_{peak,past}$ that occurred during the same demand charge period, even if the maximum power consumption occurred prior to the beginning of the current optimization period. In some embodiments, demand charge modeler 718 updates $\dot{W}_{peak,past}$ each time a new maximum power consumption is set to ensure that the energy cost model accurately represents the demand charge imposed by the power utility.

High-level optimizer 712 can use the energy cost model, indoor power consumption model, demand charge model, indoor subsystem temperature model, outdoor unit demand model, and optimization constraints to formulate an optimization problem. In some embodiments, high-level optimizer 712 seeks to minimize the total cost of energy consumed by the aggregate VRF system subject to the indoor subsystem temperature constraints and other constraints provided by the high-level models described herein. For example, high-level optimizer 712 can formulate the high-level optimization problem as:

$$\min_{x,u,\dot{W}_{peak}} \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

subject to the following constraints:

$$C_b \frac{dT_b}{dt} = -H_b(T_b - T_a) - \dot{Q}_{c,b} + \dot{Q}_{other,b}$$

$$\dot{Q}_{HVAC,k} = \sum_{b=1}^{b_n} \dot{Q}_{c,b,k}$$

$$0 \le \left( \eta_{HVAC} \dot{Q}_{HVAC,k} + \eta_{air} \sum_{b=1}^{n_b} \dot{Q}_{c,b,k} \right) \le \dot{W}_{peak}$$

$$\dot{W}_{peak,past} \le \dot{W}_{peak}$$

$$0 \le \dot{Q}_{HVAC,k} \le \dot{Q}_{HVAC,max}$$

$$T_{min} \le T_b \le T_{max}$$

and any refrigerant balance constraints, as previously described.

In some embodiments, high-level optimizer 712 converts one or more of the above-identified models and/or constraints to state-space form for use in the high-level optimization problem. For example, high-level optimizer 712 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 1 above.

High-level optimizer 712 can perform an optimization procedure to determine optimal values for each the input variables in the vector u at each time step k of the optimization period. For example, high-level optimizer 712 can determine optimal values for each of the thermal energy loads $\dot{Q}_{c,b,k}$ allocated to each indoor subsystem b at each time step k at each time step k. Each set of thermal energy loads $\dot{Q}_{c,b,k}$ with the same indoor subsystem index b forms a load profile for a particular indoor subsystem and includes a load value for each time step k in the optimization period. High-level optimizer 712 can provide the indoor subsystem load profiles to the low-level indoor controllers 612-616.

In some embodiments, high-level optimizer 712 generates a vector of predicted temperature states $\hat{T}_b$ for each low-level indoor subsystem 632-636. Each vector of predicted temperature states $\hat{T}_b$ can include a predicted temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657. High-level optimizer 712 can provide each vector of predicted temperature states $\hat{T}_b$ to the low-level indoor controller 612-616 for the corresponding low-level indoor subsystem 632-636. In some embodiments, low-level indoor controllers 612-616 use the predicted temperature states $\hat{T}_b$ to generate zone temperature setpoints that track the predicted temperature states $\hat{T}_{b,k}$ at each time step k.

In some embodiments, high-level optimizer 712 calculates the total demand $\dot{Q}_{HVAC,k}$ on outdoor subsystem 638 at each time step k as a summation of the indoor subsystem thermal energy loads $\dot{Q}_{c,b,k}$ at time step k. The set of outdoor unit demand values forms a demand profile for outdoor subsystem 638 and includes a demand value for each time step k in the optimization period. The demand value $\dot{Q}_{HVAC,k}$ for a particular time step k represents the total demand which must be satisfied by outdoor subsystem 638 at that time step k. High-level optimizer 712 can provide the outdoor unit demand profile to low-level outdoor controller 618.

Low-Level Indoor Model Predictive Controller

Figure 8:
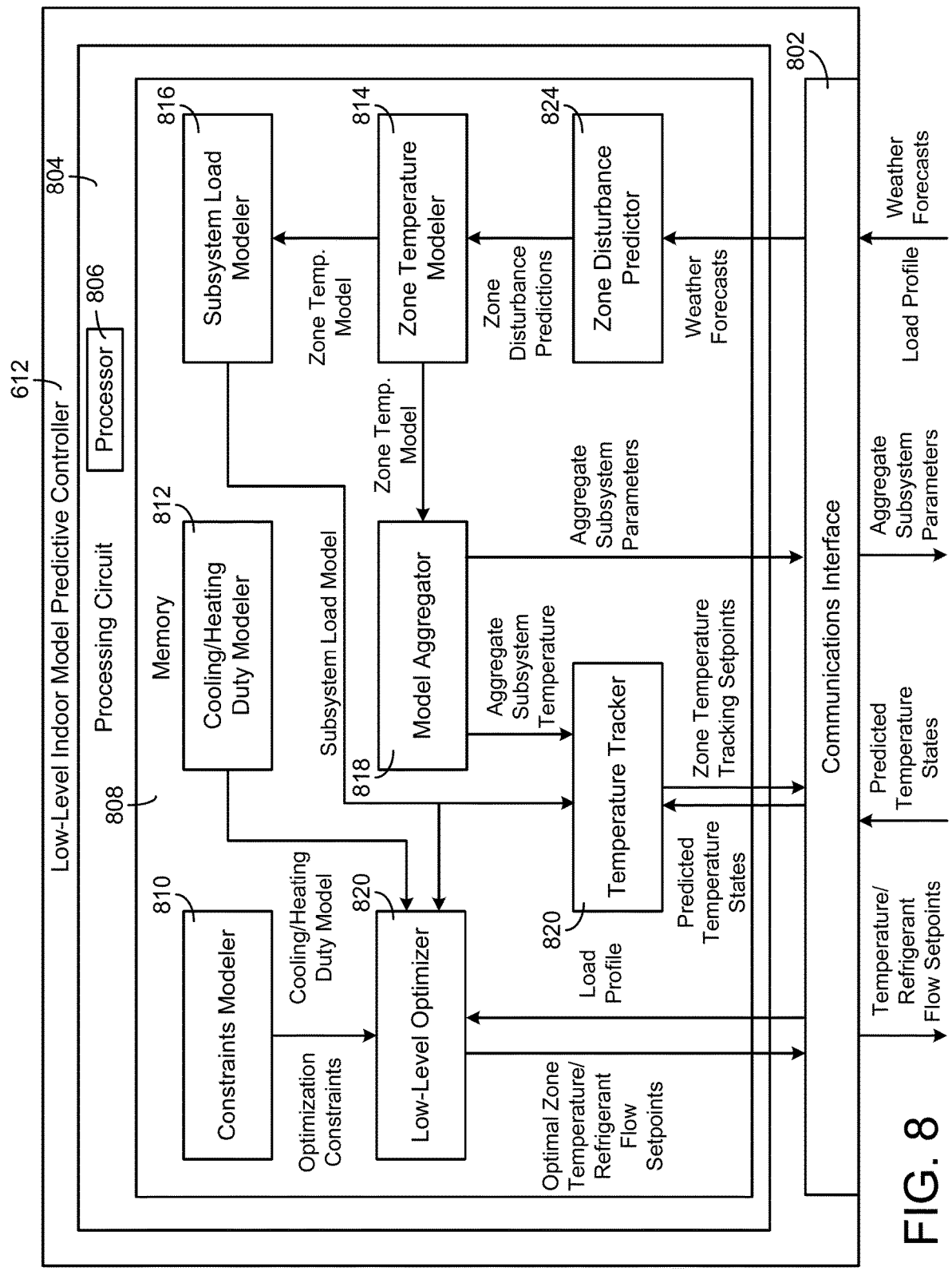
FIG. 8 is a block diagram illustrating one of the low-level indoor model predictive controllers of FIG. 6 in greater detail, according to some embodiments.

Referring now to FIG. 8, a block diagram illustrating low-level indoor model predictive controller (MPC) 612 in greater detail is shown, according to some embodiments. Although only one low-level indoor MPC 612 is shown in detail, it should be understood that any other low-level indoor MPCs in control system 600 (e.g., low-level indoor MPCs 614-616) can include some or all of the same components as low-level indoor MPC 612. Control system 600 can include any number of low-level indoor MPCs, each of which can operate independently to monitor and control a separate low-level indoor subsystem (e.g., indoor subsystems 632-636).

Low-level indoor MPC 612 is shown a communications interface 802 and a processing circuit 804. Communications interface 802 can include wired or wireless interfaces (e.g., jacks, antennas, transmitters, receivers, transceivers, wire terminals, etc.) for conducting data communications with various systems, devices, or networks. For example, communications interface 802 can include an Ethernet card and port for sending and receiving data via an Ethernet-based communications network and/or a WiFi transceiver for communicating via a wireless communications network. Communications interface 802 can be configured to communicate via local area networks or wide area networks (e.g., the Internet, a building WAN, etc.) and may use a variety of communications protocols (e.g., BACnet, IP, LON, etc.).

Communications interface 802 can be a network interface configured to facilitate electronic data communications between low-level indoor MPC 612 and various external systems or devices (e.g., weather service 604, high-level MPC 608, indoor VRF units 622, etc.). For example, low-level indoor MPC 612 can receive weather forecasts from weather service 604 and/or load predictions from load/rate predictor 602. Low-level indoor MPC 612 can receive measurements from the BMS indicating one or more measured states of the controlled building or campus (e.g., temperature, humidity, electric loads, etc.) and one or more states of indoor subsystem 632 (e.g., equipment status, power consumption, equipment availability, etc.). Low-level indoor MPC 612 can receive predicted temperature states and/or a load profile from high-level MPC 608. Low-level indoor MPC 612 can use the information received at communications interface 802 to generate zone temperature setpoints each zone of low-level indoor subsystem 632 and/or refrigerant flow setpoints for each indoor VRF unit of low-level indoor subsystem 632. Low-level indoor MPC 612 can provide the zone temperature setpoints and/or refrigerant flow setpoints to indoor VRF units 622.

Processing circuit 804 is shown to include a processor 806 and memory 808. Processor 806 can be a general purpose or specific purpose processor, an application specific integrated circuit (ASIC), one or more field programmable gate arrays (FPGAs), a group of processing components, or other suitable processing components. Processor 806 can be configured to execute computer code or instructions stored in memory 808 or received from other computer readable media (e.g., CDROM, network storage, a remote server, etc.).

Memory 808 can include one or more devices (e.g., memory units, memory devices, storage devices, etc.) for storing data and/or computer code for completing and/or facilitating the various processes described in the present disclosure. Memory 808 can include random access memory (RAM), read-only memory (ROM), hard drive storage, temporary storage, non-volatile memory, flash memory, optical memory, or any other suitable memory for storing software objects and/or computer instructions. Memory 808 can include database components, object code components, script components, or any other type of information structure for supporting the various activities and information structures described in the present disclosure. Memory 808 can be communicably connected to processor 806 via processing circuit 804 and can include computer code for executing (e.g., by processor 806) one or more processes described herein. When processor 806 executes instructions stored in memory 808, processor 806 generally configures low-level indoor MPC 612 (and more particularly processing circuit 804) to complete such activities.

Still referring to FIG. 8, low-level indoor MPC 612 is shown to include a zone disturbance predictor 824. Zone disturbance predictor 824 can generate a disturbance forecast for each zone i of indoor subsystem 632. Throughout this disclosure, the index i is used to denote individual zones, where i=1 ... $n_z$ and $n_z$ is the total number of zones in a given indoor subsystem. In some embodiments, each zone i is uniquely associated with a particular indoor VRF unit configured to control the temperature of the zone i. Accordingly, the index i can also denote individual indoor VRF units. The disturbance forecast for zone i can include a vector of disturbance values $\dot{Q}_{other,i}$, where each element of the vector $\dot{Q}_{other,i}$ includes a predicted disturbance value $\dot{Q}_{other,i,k}$ for a particular time step k of the optimization period.

Zone disturbance predictor 824 is shown receiving weather forecasts from a weather service 604. In some embodiments, zone disturbance predictor 824 generates the disturbance forecasts as a function of the weather forecasts. In some embodiments, zone disturbance predictor 824 uses feedback from regulatory layer 620 to generate the disturbance forecasts. Feedback from regulatory layer 620 can include various types of sensory inputs (e.g., temperature, flow, humidity, enthalpy, etc.) or other data relating to the controlled building or campus (e.g., building occupancy data, building electric load, etc.). In some embodiments, zone disturbance predictor 824 uses a deterministic plus stochastic model trained from historical load data to generate the disturbance forecasts. Zone disturbance predictor 824 can use any of a variety of prediction methods to generate the disturbance forecasts (e.g., linear regression for the deterministic portion and an autoregressive model for the stochastic portion).

Zone disturbance predictor 824 can predict one or more different types of disturbances for each building zone i. For example, zone disturbance predictor 824 can predict a thermal load resulting from heat transfer between the air within building zone i and outside air through the walls of the building. Zone disturbance predictor 824 can predict a thermal load resulting from internal heat generation within the building zone (e.g., heat generated by electronics in the building zone, heat generated by zone occupants, etc.). In some embodiments, zone disturbance predictor 824 makes disturbance predictions using the predictive techniques described in U.S. patent application Ser. No. 14/717,593.

Still referring to FIG. 8, low-level indoor MPC 612 is shown to include a zone temperature modeler 814. Zone temperature modeler 814 can generate a temperature model for each building zone i of indoor subsystem 632. Indoor subsystem 632 can have any number of zones. In some embodiments, the temperature of each zone can be independently controlled and/or adjusted. Some building zones can exchange heat with each other (e.g., if the building zones are adjacent to one another), whereas other building zones do not directly exchange energy. In general, zone temperature modeler 814 can generate $n_z$ zone temperature models, where $n_z$ is the total number of zones in indoor subsystem 632.

In some embodiments, zone temperature modeler 814 models the temperature of each building zone using a zone heat transfer model. The dynamics of heating or cooling a single building zone are described by the energy balance:

$$C\frac{dT}{dt} = -H(T - T_a) - \dot{Q}_c + \dot{Q}_{other}$$

where C is the thermal capacitance of the building zone, H is the ambient heat transfer coefficient for the building zone, T is the temperature of the building zone, $T_a$ is the ambient temperature outside the building zone (e.g., the outside air temperature), $\dot{Q}_c$ is the amount of cooling applied to the building zone (i.e., the cooling load), and $\dot{Q}_{other}$ is the external load, radiation, or other disturbance experienced by the building zone. In the previous equation, $\dot{Q}_c$ represents heat transfer out of the building zone (i.e., cooling) by the HVAC system and therefore has a negative sign. However, if heating is applied to the building zone rather than cooling, the sign on $\dot{Q}_c$ can be switched to a positive sign such that $\dot{Q}_c$ represents the amount of heating applied to the building zone by the HVAC system (i.e., the heating load).

The previous equation combines all mass and air properties of the building zone into a single zone temperature. Other heat transfer models which can be used by zone temperature modeler 814 include the following air and mass zone models:

$$C_z \frac{dT_z}{dt} = H_{az}(T_a - T_z) + H_{mz}(T_m - T_z) - \dot{Q}_c + \dot{Q}_{other}$$

$$C_m \frac{dT_m}{dt} = H_{mz}(T_z - T_m)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by zone temperature modeler 814 include the following air, shallow mass, and deep mass zone models:

$$C_z \frac{dT_z}{dt} = H_{az}(T_a - T_z) + H_{sz}(T_s - T_z) - \dot{Q}_c + \dot{Q}_{other}$$

$$C_s \frac{dT_s}{dt} = H_{sz}(T_z - T_s) + H_{ds}(T_d - T_s)$$

$$C_d \frac{dT_d}{dt} = H_{ds}(T_s - T_d)$$

where $C_z$ and $T_z$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, zone temperature modeler 814 models the temperature of each building zone using the following zone temperature model:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by MPC system 600 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 814 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

Zone temperature modeler 814 can use the zone disturbance estimates received from zone disturbance predictor 824 to identify appropriate values of the external disturbance $\dot{Q}_{other,i}$ for each zone i at each time step of the optimization period. In some embodiments, zone temperature modeler 814 uses the weather forecasts from weather service 604 and/or the load and rate predictions provided by load/rate predictor 602 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 808, or otherwise provided to zone temperature modeler 814. Zone temperature modeler 814 can generate a zone temperature model for each zone i, where i=1 . . . $n_z$ and $n_z$ is the total number of zones.

Still referring to FIG. 8, low-level indoor MPC 612 is shown to include a subsystem load modeler 816. Subsystem load modeler 816 can generate a model of the total amount of thermal energy delivered to the indoor subsystem $Q_{total}$ (e.g., the total amount of heating or cooling delivered to the subsystem) as a function of the individual zone loads $\dot{Q}_{c,i}$. In some embodiments, subsystem load modeler 816 models the total subsystem load using the following equation:

$$\frac{dQ_{total}}{dt} = \sum_{i=1}^{n_z} \dot{Q}_{c,i}$$

where $Q_{total}$ is the total amount of thermal energy (e.g., heating or cooling) delivered to the indoor subsystem and $\dot{Q}_{c,i}$ is the rate at which thermal energy is being delivered (units of power) of a particular zone i. The indoor subsystem load model can sum the thermal energy loads $\dot{Q}_{c,i}$ of each building zone to calculate the total indoor subsystem thermal energy load $$\frac{dQ_{total}}{dt},$$

which is the derivative of the total amount of thermal energy $Q_{total}$ delivered to the indoor subsystem.

Low-level indoor MPC 612 is shown to include a cooling/heating duty modeler 820. Cooling/heating duty modeler 820 can generate one or more models that define the thermal energy load $\dot{Q}_{c,i}$ of each building zone as a function of the zone temperature $T_i$ and a zone setpoint $u_i$ as shown in the following equation:

$$\dot{Q}_{c,i} = f(T_i, u_i)$$

The models generated by cooling/heating duty modeler 820 can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, the zone setpoint $u_i$ includes an operating mode setpoint $z_i$ (e.g., heating or cooling) and a refrigerant flow setpoint $m_i$. For example, the zone setpoint $u_i$ can be represented as follows:

$$u_i = \begin{bmatrix} z_i \\ m_i \end{bmatrix}$$

where the variable $z_i$ denotes the operating mode of the indoor VRF unit for building zone i and the variable $m_i$ denotes the refrigerant flow rate setpoint for the indoor VRF unit for building zone i. In some embodiments, the operating mode $z_i$ is a binary variable, as shown in the following equation:

$$z_i = \begin{cases} 1 & \text{Cooling} \\ 0 & \text{Heating (Not Cooling)} \end{cases}$$

where a value of $z_i=1$ indicates that the operating mode is cooling, whereas a value of $z_i=0$ indicates that the operating mode is heating or not cooling.

In some embodiments, cooling/heating duty modeler 820 relates zone thermal energy load $\dot{Q}_{c,i}$ (i.e., the cooling duty or heating duty of building zone i) to refrigerant flow $m_i$ using the following model:

$$\dot{Q}_{c,i} = \begin{cases} \alpha_{i,c}(T_i) \cdot m_i & \text{if } z_i = 1 \\ \alpha_{i,h}(T_i) \cdot m_i & \text{if } z_i = 0 \end{cases}$$

where $\alpha_{i,c}(T_i)$ is a conversion factor between zone cooling duty (i.e., zone thermal energy load $\dot{Q}_{c,i}$ when the operating mode is cooling) and the refrigerant flow $m_i$, and $\alpha_{i,h}(T_i)$ is a conversion factor between zone heating duty (i.e., zone thermal energy load when the operating mode is heating) and the refrigerant flow $m_i$. In some embodiments, both conversion factors $\alpha_{i,c}(T_i)$ and $\alpha_{i,h}(T_i)$ are a function of the zone temperature $T_i$. The relationships between zone temperature $T_i$ and the conversion factors $\alpha_{i,c}(T_i)$ and $\alpha_{i,h}(T_i)$ can be predefined such that cooling/heating duty modeler 820 can calculate the values of $\alpha_{i,c}(T_i)$ and $\alpha_{i,h}(T_i)$ based on a measured or estimated zone temperature $T_i$. In other embodiments, one or both conversion factors $\alpha_{i,c}(T_i)$ and $\alpha_{i,h}(T_i)$ can have constant values, in which case the cooling/heating duty model can be formulated as a mixed integer linear program (MILP).

In some embodiments, the zone setpoint $u_i$ is a zone temperature setpoint $T_{sp,i}$. Cooling/heating duty modeler 820 can relate zone thermal energy load $\dot{Q}_{c,i}$ to the zone temperature $T_i$ and the zone temperature setpoint $T_{sp,i}$ using multiple models. For example, cooling/heating duty modeler 820 can use a model of the zone regulatory controller to determine the control action performed by the controller as a function of the zone temperature $T_i$ and the zone temperature setpoint $T_{sp,i}$. An example of such a zone regulatory controller model is shown in the following equation:

$$v_{air,i} = f_1(T_i, T_{sp,i})$$

where $v_{air,i}$ is the rate of airflow to building zone i (i.e., the control action). The function $f_1$ can be identified from data. For example, cooling/heating duty modeler 820 can collect measurements of $v_{air,i}$ and $T_i$ and identify the corresponding value of $T_{sp,i}$. Cooling/heating duty modeler 820 can perform a system identification process using the collected values of $v_{air,i}$, $T_i$, and $T_{sp,i}$ as training data to determine the function $f_1$ that defines the relationship between such variables.

Cooling/heating duty modeler 820 can use an energy balance model relating the control action $v_{air,i}$ to the zone thermal energy load $\dot{Q}_{c,i}$, as shown in the following equation:

$$\dot{Q}_{c,i} = f_2(v_{air,i})$$

where the function $f_2$ can be identified from training data. Cooling/heating duty modeler 820 can perform a system identification process using collected values of $v_{air,i}$ and $\dot{Q}_{c,i}$ to determine the function $f_2$ that defines the relationship between such variables.

In some embodiments, a linear relationship exists between $\dot{Q}_{c,i}$ and $v_{air,i}$. Assuming an ideal proportional-integral (PI) controller and a linear relationship between $\dot{Q}_{c,i}$ and $v_{air,i}$, a simplified linear controller model can be used to define the thermal energy load $\dot{Q}_{c,i}$ of each building zone as a function of the zone temperature $T_i$ and the zone temperature setpoint $T_{sp,i}$. An example of such a model is shown in the following equations:

$$\dot{Q}_{c,i} = \dot{Q}_{ss,i} + K_{c,i}\left[\varepsilon_i + \frac{1}{\tau_{I,i}}\int_0^t \varepsilon_i(t')dt'\right]$$

$$\varepsilon_i = T_{sp,i} - T_i$$

where $\dot{Q}_{ss,i}$ is the steady-state rate of heating or cooling rate, $K_{c,i}$ is the scaled zone PI controller proportional gain, $\tau_{I,i}$ is the zone PI controller integral time, and $\varepsilon_i$ is the setpoint error (i.e., the difference between the zone temperature setpoint $T_{i,sp}$ and the zone temperature $T_{sp}$). Saturation can be represented by constraints on $\dot{Q}_{c,i}$. If a linear model is not sufficiently accurate to model the PI controller and heat transfer in the indoor VRF unit for zone i, a nonlinear heating/cooling duty model can be used instead.

Advantageously, modeling the regulatory controllers (e.g., zone PI controllers) in the low-level optimization problem allows low-level indoor MPC 612 to use the dynamics of the regulatory controllers when determining the optimal temperature setpoints. In some embodiments, the responses of the regulatory controllers can be sluggish. For example, it can take some zones up to an hour to reach a new temperature setpoint. Using the dynamics of the regulatory controllers in the low-level MPC problem allows low-level indoor MPC 612 to consider the time between control action and effect such that optimal temperature setpoints can be selected in view of time-varying energy prices.

Still referring to FIG. 8, low-level indoor MPC 612 is shown to include a constraints modeler 810. Constraints modeler 810 can generate and impose optimization constraints on the optimization procedure performed by low-level optimizer 812. Constraints imposed by constraints modeler 810 can include, for example, equipment capacity constraints and zone temperature constraints. In some embodiments, constraints modeler 810 imposes constraints on the zone temperature $T_i$. For example, constraints modeler 810 can constrain the zone temperature $T_i$ between a minimum temperature $T_{min}$ and a maximum temperature $T_{max}$ as shown in the following equation:

$$T_{min} \leq T_i \leq T_{max}$$

where the values of $T_{min}$ and $T_{max}$ can be adjusted based on the temperature setpoints of the indoor subsystem.

In some embodiments, constraints modeler 810 automatically adjusts the values of $T_{min}$ and $T_{max}$ based on information received from the BMS for the building zone. For example, constraints modeler 810 can use a temperature setpoint schedule and/or occupancy schedule for the building zone to automatically adjust the values of $T_{min}$ and $T_{max}$ for each time step k. This allows constraints modeler 810 to use temperature limits based on the time-varying setpoint temperature range for the zone so that the zone temperature $T_i$ is maintained within time-appropriate temperature limits $T_{min}$ and $T_{max}$.

In some embodiments, constraints modeler 810 imposes a constraint to ensure that the total indoor subsystem load during any time step k is no greater than the thermal energy load allocated to the indoor subsystem by high-level MPC 608. For example, constraints modeler 810 can impose the constraint:

$$\frac{Q_{total,k+1} - Q_{total,k}}{\Delta} \leq \dot{Q}_{c,b,k}$$

where $Q_{total,k+1}$ is the total indoor subsystem energy consumed at time step k+1, $Q_{total,k}$ is the total indoor subsystem energy consumed at time step k, $\dot{Q}_{c,b,k}$ is the thermal energy load allocated to the indoor subsystem b by high-level MPC 608, and $\Delta$ is the duration of each time step. The left side of the equation represents the indoor subsystem thermal energy load during time step k (i.e., the change in total thermal energy delivered between consecutive time steps divided by the time step duration), whereas the right side of the equation represents the thermal energy load allocated to indoor subsystem b during time step k by high-level MPC 608.

In some embodiments, constraints modeler 810 imposes an additional constraint to ensure that the total amount of thermal energy delivered does not decrease between consecutive time steps, as shown in the following equation:

$$Q_{total,k+1} - Q_{total,k} \geq 0$$

Since $Q_{total,k+1}$ is a summation of the amount of thermal energy delivered up to time step k+1, this constraint prevents low-level optimizer 812 from selecting a negative value for the thermal energy load $\dot{Q}_{c,i}$ at time step k. In other words, the rate at which thermal energy is delivered (i.e., $\dot{Q}_{c,i}$) can add to the total amount of thermal energy delivered over the optimization period, but cannot subtract from the total amount of thermal energy delivered.

Low-level optimizer 812 can use the zone temperature models, indoor subsystem load model, cooling/heating duty model, and optimization constraints to formulate an optimization problem. In some embodiments, the low-level optimization problem seeks to minimize the total amount of thermal energy $Q_{total,N}$ used by the indoor subsystem 632 over the optimization period subject to the zone temperature constraints and other constraints provided by the low-level models described herein. For example, low-level optimizer 812 can formulate the low-level optimization problem as:

$$\min_{x,u} Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

In some embodiments, low-level optimizer 812 converts one or more of the above-identified models and/or constraints to state-space form for use in the low-level optimization problem. For example, low-level optimizer 812 can convert the preceding equations into a discretized state-space model of the form:

$$x_{k+1} = Ax_k + Bu_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. Table 2 illustrates the variables that can be included in each of these vectors:

TABLE 2

| Variables in Low-Level Optimization | | |
|---|---|---|
| States | $x = [T_i \; \overline{\in}_i \; Q_{total}]^T$ | $n = 2n_z + 1$ |
| Inputs | $u = [u_i]^T$ | $m = n_z$ |
| Measurements | $y = [T_i \; Q_{total}]^T$ | $p = n_z + 1$ |
| Disturbances | $d = [T_a \; \dot{Q}_{other,i} \; \dot{Q}_{ss,i}]^T$ | $n_d = 2n_z + 1$ |

As shown in Table 2, the system states vector x includes the zone temperature $T_i$, the integral of the zone tracking error $\overline{\in}_i$, and the total thermal energy delivered to the indoor subsystem. In some embodiments, the system states vector x includes a zone temperature $T_i$ and an integrated zone tracking error $\overline{\in}_i$ for each of the $n_z$ zones and single total thermal energy value such that the total number n of variables in the system states vector x is equal to $2n_z+1$. The inputs vector u can include the zone setpoint $u_i$ (e.g., zone temperature setpoint $T_{sp,i}$ or operating mode $z_i$ and refrigerant flow rate $m_i$). In some embodiments, the inputs vector u includes a zone setpoint $u_i$ for each of the $n_z$ zones such that the total number m of variables in the inputs vector u is equal to $n_z$.

In some embodiments, the measurements vector y is the same as the system states vector x, but without the integrated zone tracking error $\overline{\in}_i$. This indicates that the zone temperature $T_i$ and the total amount of thermal energy delivered $Q_{total}$ are directly measured. The value of the integrated zone tracking error $\overline{\in}_i$ can be calculated from the difference between $T_{i,sp}$ and $T_i$. The disturbance vector d can include the ambient air temperature $T_a$, the estimated disturbance $\dot{Q}_{other,i}$ for each zone, and the steady-state rate of heating/cooling $\dot{Q}_{ss,i}$ for each zone. In some embodiments, the disturbances vector d includes an estimated disturbance $\dot{Q}_{other,i}$ and a steady-state rate of heating/cooling $\dot{Q}_{ss,i}$ for each of the $n_z$ indoor subsystems and a single ambient air temperature $T_a$ such that the total number $n_d$ of variables in the disturbances vector d is equal to $n_z+1$.

In some embodiments, the system states x can be constructed or predicted from the measurements y. For example, low-level indoor MPC 612 can use a Kalman filter or other predictive technique to construct the system states x from the measurements y. The values of the A, B, C, and D, matrices in the state-space representation can be identified using a system identification technique. Examples of state prediction and system identification techniques which can be used by low-level indoor MPC 612 are described in detail in U.S. Pat. No. 9,235,657.

Still referring to FIG. 8, low-level indoor MPC 612 is shown to include a model aggregator 818. Model aggregator 818 can generate aggregate values for various indoor subsystem parameters and/or variables used in the low-level optimization. For example, model aggregator 818 can generate an aggregate subsystem temperature $T_b$ for the low-level indoor subsystem by aggregating the individual zone temperatures $T_i$ of each zone in the subsystem. In some embodiments, model aggregator 818 generates the aggregate subsystem temperature $T_b$ using the following equation:

$$T_b = \frac{\sum_{i=1}^{n_z} C_i T_i}{\sum_{i=1}^{n_z} C_i}$$

where $C_i$ is the thermal capacitance of zone i and $T_i$ is the temperature of zone i. The numerator of the previous equation represents the total amount of heat in the subsystem, whereas the denominator represents the total thermal capacitance of the subsystem. Both quantities are summed across all subsystem zones i=1 . . . $n_z$. Model aggregator 818 can divide the total amount of heat by the total thermal capacitance to estimate an average subsystem temperature $T_b$. Model aggregator 818 can calculate an aggregate subsystem temperature $T_{b,k}$ for each time step k of the optimization period.

Model aggregator 818 can calculate aggregate values for other subsystem parameters or variables such as the subsystem thermal capacitance $C_b$, the subsystem heat transfer coefficient $H_b$, and the estimated subsystem disturbance $\dot{Q}_{other,b}$. In some embodiments, model aggregator 818 calculates the aggregate values for these variables and parameters using the following equations:

$$C_b = \sum_{i=1}^{n_z} C_i$$

$$H_b = \sum_{i=1}^{n_z} H_i$$

$$\dot{Q}_{other,b} = \sum_{i=1}^{n_z} \dot{Q}_{other,i}$$

where the subsystem thermal capacitance $C_b$ is the summation of the zone thermal capacitance $C_i$ values for each subsystem zone, the subsystem heat transfer coefficient $H_b$ is the summation of the zone heat transfer coefficients $H_i$ values for each subsystem zone, and the estimated subsystem disturbance $\dot{Q}_{other,b}$ is the summation of the estimated subsystem disturbances $\dot{Q}_{other,i}$ for each subsystem zone. Model aggregator 818 can calculate aggregate values of $C_{b,k}$, $H_{b,k}$, and $\dot{Q}_{other,b,k}$ or each time step k of the optimization period.

In some embodiments, model aggregator 818 provides the aggregate subsystem parameters and variables $T_b$, $C_b$, $H_b$, and $\dot{Q}_{other,b}$ to high-level MPC 608. High-level MPC 608 can use such values as inputs to the high-level models, constraints, and optimization function used in the high-level optimization. Advantageously, the model aggregation performed by model aggregator 818 helps to reduce the amount of information exchanged between each low-level indoor MPC 612-616 and high-level MPC 608. For example, each low-level indoor MPC 612-616 can provide high-level MPC 608 with the aggregate values described above rather than individual values of such variables and parameters for each building zone.

Still referring to FIG. 8, low-level indoor MPC 612 is shown to include a temperature tracker 822. In some embodiments, temperature tracker 822 performs an alternative optimization which can supplement or replace the low-level optimization performed by low-level optimizer 812. Rather than minimizing the total thermal energy $Q_{total,N}$ used by the low-level indoor subsystem, temperature tracker 822 can generate zone temperature setpoints $T_{sp,i}$ which track the predicted subsystem temperature states $\hat{T}_{b,k}$ generated by high-level MPC 608 as a result of the high-level optimization. For example, high-level MPC 608 can calculate the subsystem temperature states $\hat{T}_{b,k}$ for each low-level indoor subsystem 632-636 predicted to result from the load profiles generated by high-level MPC 608. As described above, the predicted temperature states $\hat{T}_{b,k}$ can be calculated using a Kalman filter or any other type of state prediction technique. High-level MPC 608 can provide the predicted temperature states $\hat{T}_{b,k}$ to each low-level indoor MPC 612-616 for use in the temperature tracking process.

Temperature tracker 822 is shown receiving the predicted temperature states $\hat{T}_{b,k}$ via communications interface 802. Temperature tracker 822 can also receive the aggregate subsystem temperatures $T_{b,k}$ generated by model aggregator 818. Temperature tracker 822 can formulate an objective function which seeks to minimize the error between the aggregate subsystem temperatures $T_{b,k}$ and the predicted temperature states $\hat{T}_{b,k}$, as shown in the following equation:

$$\sum_{k=1}^{N} \frac{1}{2} \|T_{b,k} - \hat{T}_{b,k}\|^2 + \mu Q_{total,N}$$

where $\mu$ is a small penalty factor applied to the total amount of thermal energy $Q_{total,N}$ used by the indoor subsystem over the optimization period. The value of $\mu$ can be adjusted to increase or decrease the weight assigned to the total amount of thermal energy $Q_{total,N}$ relative to the temperature tracking error.

Temperature tracker 822 can use the previous equation as the objective function in an optimization procedure to determine optimal values for the zone temperature setpoints $T_{sp,i}$. The optimization performed by temperature tracker 822 can be similar to the optimization performed by low-level optimizer 812, with the exception that temperature tracker 822 is not constrained by the load profile provided by high-level MPC 608 and seeks to optimize a different objective function. For example, temperature tracker 822 can minimize the objective function:

$$\min_{x,u} \sum_{k=1}^{N} \frac{1}{2} \|T_{b,k} - \hat{T}_{b,k}\|^2 + \mu Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_b = \frac{\sum_{i=1}^{n_z} C_i T_i}{\sum_{i=1}^{n_z} C_i}$$

$$T_{min} \leq T_i \leq T_{max}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

In some embodiments, temperature tracker 822 converts one or more of the above-identified models and/or constraints to state-space form for use in the low-level optimization problem. For example, temperature tracker 822 can convert the preceding equations into a discretized state-space model of the form:

$$x_{k+1} = Ax_k + B_d d_k$$

$$y_k = Cx_k + Du_k$$

where $x_k$ is a vector of system states at time step k, $u_k$ is a vector of system inputs at time step k, $y_k$ is a vector of measurements or system outputs at time step k, $d_k$ is a vector of disturbances at time step k, and $x_{k+1}$ is a vector of (predicted) system states at time k+1. The variables included in each vector can be the same as shown in Table 2 above.

Flow Diagrams

Figure 9:
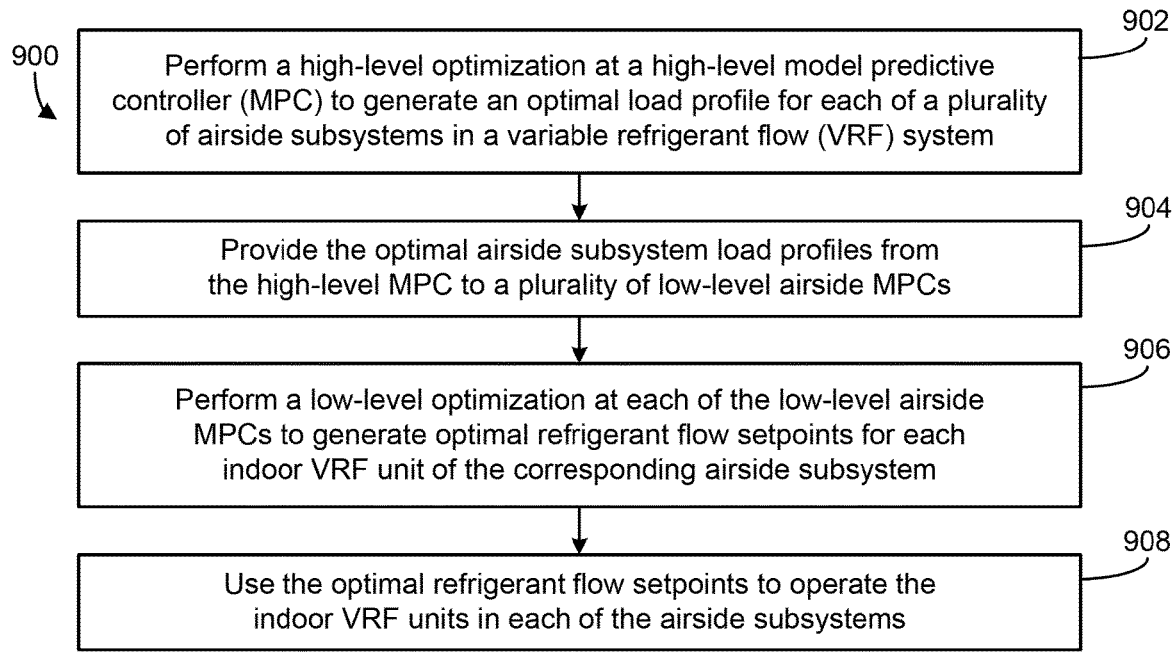
FIG. 9 is a flow diagram of a high-level and distributed low-level model predictive control technique which can be used to optimize energy cost in the MPC system of FIG. 6 when indoor subsystem loads are used as constraints in the low-level optimizations, according to some embodiments.

Referring now to FIG. 9, a flow diagram 900 illustrating a model predictive control technique which can be performed by MPC system 600 is shown, according to some embodiments. Flow diagram 900 is shown to include performing a high-level optimization at a high-level model predictive controller (MPC) to generate an optimal load profile for each of a plurality of indoor subsystems in a variable refrigerant flow (VRF) system (block 902). In some embodiments, the high-level optimization is performed by high-level MPC 608, as described with reference to FIGS. 6-7. For example, the high-level optimization can include generating a high-level energy cost function defining the energy cost as a function of a outdoor unit demand profile $\dot{Q}_{HVAC}$. In some embodiments, the outdoor unit demand profile $\dot{Q}_{HVAC}$ indicates a thermal energy or refrigerant state allocation of the outdoor subsystem at each of a plurality of time steps k in an optimization period.

In some embodiments, high-level MPC 608 generates an energy cost function that accounts for the per-unit costs of energy consumption in outdoor subsystem 638 and the demand charge, but does not account for energy consumption in indoor subsystems 632-636. An example of such an energy cost function is shown in the following equation:

$$\text{Energy Cost} = \sum_{k=0}^{N-1} c_k \eta_{tot} \dot{Q}_{HVAC,k} \Delta + c_{peak} \eta_{tot} \dot{Q}_{peak}$$

The first term of the energy cost function accounts for the per-unit costs (e.g., $/kWh) of energy consumed during each time step k of the optimization period. In some embodiments, $c_k$ is the cost per unit of energy consumed at time step k to satisfy the total outdoor unit demand $\dot{Q}_{HVAC,k}$ at time step k, the parameter $\eta_{tot}$ is the inverse of the coefficient of performance of the aggregate VRF system (e.g., $0.1 \leq \eta_{tot} \leq 0.25$), and $\Delta$ is the duration of time step k. Accordingly, the term $\eta_{tot} \dot{Q}_{HVAC,k} \Delta$ represents the total amount of energy consumed (e.g., kWh) during time step k to satisfy the outdoor unit demand $\dot{Q}_{HVAC,k}$. Multiplying by the cost $c_k$ per unit energy consumed (e.g., $/kWh) yields the total cost (e.g., $) of the energy consumed during time step k. The energy cost function can include a summation of the energy costs during each time step k to determine the total cost of energy consumption over the optimization period.

The second term of the energy cost function accounts for the demand charge. In some embodiments, $c_{peak}$ is the demand charge rate (e.g., $/kW), $\dot{Q}_{peak}$ is the peak outdoor unit demand during the demand charge period (e.g., the maximum of $\dot{Q}_{HVAC,k}$), and $\eta_{tot}$ is the inverse of the coefficient of performance of the aggregate VRF system. Accordingly, the term $\eta_{tot} \dot{Q}_{peak}$ represents the peak power consumption to satisfy the peak outdoor unit demand $\dot{Q}_{peak}$. Multiplying by the demand charge rate $c_{peak}$ yields the total cost (e.g., $) of the demand charge.

In some embodiments, high-level MPC 608 generates an energy cost function that accounts for the per-unit costs of energy consumption in outdoor subsystem 638, the demand charge, and the energy consumption in indoor subsystems 632-636. An example of such an energy cost function is shown in the following equation:

$$\text{Energy Cost} = \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

The first portion of the energy cost function accounts for the per unit costs (e.g., $/kWh) of energy consumed by outdoor subsystem 638 during each time step k of the optimization period. In some embodiments, $c_k$ is the cost per unit of energy consumed at time step k, $\Delta$ is the duration of time step k, and $\eta_{HVAC}$ is the inverse of the coefficient of performance of outdoor subsystem 638 (e.g., $\eta_{HVAC} \sim 0.2$). The term $\eta_{HVAC} \dot{Q}_{HVAC,k}$ represents the amount of power consumption (e.g., kW) by outdoor subsystem 638 during time step k to satisfy the outdoor unit demand $\dot{Q}_{HVAC,k}$. Multiplying by the cost $c_k$ per unit energy consumed (e.g., $/kWh) and the duration $\Delta$ (e.g., hours) yields the total cost (e.g., $) of the energy consumed during time step k by outdoor subsystem 638. The first portion of the energy cost function can be summed across all time steps k=0 ... N-1 of the optimization period to determine the total energy consumed by outdoor subsystem 638 over the duration of the optimization period.

The second portion of the energy cost function accounts for the per unit costs (e.g., $/kWh) of energy consumed by each indoor subsystem during each time step k of the optimization period. As described above, $\eta_{air}$ is the inverse of the coefficient of performance of the indoor subsystems (e.g., $\eta_{air} \sim 0.1$) and $\dot{Q}_{c,b,k}$ is the thermal energy load delivered by the indoor subsystem for indoor subsystem b at time step k. The term $\eta_{air} \dot{Q}_{c,b,k}$ represents the power consumption $\dot{W}_{air,b}$ of the indoor VRF units for indoor subsystem b. The second portion of the energy cost function can be summed across all indoor subsystems b=1 ... $n_b$ and across all time steps k=0 ... N-1 to determine the total power consumption of all indoor subsystems over the duration of the optimization period. Multiplying by the cost $c_k$ per unit energy consumed (e.g., $/kWh) and the duration $\Delta$ (e.g., hours) yields the total cost (e.g., $) of the energy consumed by the indoor subsystems over the duration of the optimization period.

The third portion of the energy cost function accounts for the demand charge. In some embodiments, $c_{peak}$ is the demand charge rate (e.g., $/kW) and $\dot{W}_{peak}$ is the peak aggregate power consumption during the applicable demand charge period. Multiplying by the demand charge rate $c_{peak}$ yields the total cost (e.g., $) of the demand charge.

In some embodiments, performing the high-level optimization in block 902 includes using a outdoor unit demand model to define the outdoor unit demand profile $\dot{Q}_{HVAC}$ as a function of the plurality of indoor subsystem load profiles $\dot{Q}_{c,b}$. Each indoor subsystem load profile $\dot{Q}_{c,b}$ can indicate a thermal energy allocation to one of the indoor subsystems at each of the plurality of time steps.

In some embodiments, the outdoor unit demand model represents the demand on outdoor subsystem 638 as a function of the thermal energy load $\dot{Q}_{c,b}$ allocated to each indoor subsystem at each time step of the optimization period. An example of such an outdoor unit demand model is shown in the following equation:

$$\dot{Q}_{HVAC,k} = \sum_{b=1}^{b_n} \dot{Q}_{c,b,k}$$

where $\dot{Q}_{HVAC,k}$ is the outdoor unit demand at time step k (e.g., the thermal energy or refrigerant state allocation of outdoor subsystem 638 at time step k), $\dot{Q}_{c,b,k}$ is the thermal energy load allocated to indoor subsystem b at time step k, and $\dot{Q}_{storage,k}$ is the amount of thermal energy being stored in the TES tanks during time step k. The previous equation indicates that the total demand $\dot{Q}_{HVAC,k}$ on the outdoor subsystem 638 is a summation of the thermal energy loads $\dot{Q}_{c,b,k}$ allocated to each indoor subsystem b. This equation can be used by high-level MPC 608 as an energy balance constraint to ensure that outdoor subsystem 638 generates enough thermal energy to cover the indoor subsystem loads at each time step k.

In some embodiments, the high-level optimization in block 902 includes generating an indoor subsystem temperature model for each of the plurality of indoor subsystems. Each indoor subsystem temperature model can define a relationship between the thermal energy allocation $\dot{Q}_{c,b}$ to an indoor subsystem and a temperature $T_b$ of the indoor subsystem. An example of such an indoor subsystem temperature model is shown in the following equation:

$$C_b \frac{dT_b}{dt} = -H_b(T_b - T_a) - \dot{Q}_{c,b} + \dot{Q}_{other,b}$$

where $C_b$ and $T_b$ are the thermal capacitance and temperature of the indoor subsystem designated by index b, $T_a$ is the ambient air temperature outside indoor subsystem b (e.g., outside air temperature), $H_b$ is the heat transfer coefficient between indoor subsystem b and the ambient air, $\dot{Q}_{c,b}$ is the amount of cooling applied to the indoor subsystem by MPC system 600 (i.e., the amount of heat removed from the indoor subsystem), and $\dot{Q}_{other,b}$ is the external load, radiation, or disturbance experienced by the indoor subsystem b. If heating is provided to the indoor subsystem rather than cooling, the sign on $\dot{Q}_{c,b}$ can be switched from a negative sign to a positive sign.

The high-level optimization can use the indoor subsystem disturbance estimates received from low-level indoor controllers 612-616 to identify appropriate values of the external disturbance $\dot{Q}_{other,b}$ for each indoor subsystem b at each time step of the optimization period. In some embodiments, the high-level optimization uses the weather forecasts from weather service 604 and/or the load and rate predictions provided by load/rate predictor 602 to determine appropriate values for the ambient air temperature $T_a$ and/or the external disturbance $\dot{Q}_{other,b}$ for each indoor subsystem b at each time step of the optimization period. Values of $C_b$ and $H_b$ can be specified as parameters of the indoor subsystem b, received from the low-level indoor controller for the indoor subsystem b, received from a user, retrieved from memory, or otherwise provided to high-level MPC 608. The high-level optimization can include generating a temperature model for each indoor subsystem b, where $b=1 \ldots n_b$ and $n_b$ is the total number of indoor subsystems.

In some embodiments, performing the high-level optimization in block 902 includes optimizing the energy cost and the plurality of indoor subsystem load profiles subject to constraints provided by the outdoor unit demand model and each indoor subsystem temperature model. The high-level optimization can use the energy cost model, demand charge model, indoor subsystem temperature model, outdoor unit demand model, and optimization constraints to formulate an optimization problem.

In some embodiments, the high-level optimization seeks to minimize the total cost of energy consumed by outdoor subsystem 638 (i.e., energy cost and demand charge) subject to the indoor subsystem temperature constraints and other constraints provided by the high-level models described herein. For example, the high-level optimization can formulate the high-level optimization problem as:

$$\min_{x,u,\dot{Q}_{peak}} \sum_{k=0}^{N-1} c_k \eta_{tot} \dot{Q}_{HVAC,k} \Delta + c_{peak} \eta_{tot} \dot{Q}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \leq \dot{Q}_{HVAC,k} \leq \dot{Q}_{peak}$$

$$\dot{Q}_{peak,past} \leq \dot{Q}_{peak} \leq \dot{Q}_{HVAC,max}$$

$$0 \leq s_k \leq s_{max}$$

$$T_{min} \leq T_b \leq T_{max}$$

In some embodiments, the high-level optimization seeks to minimize the total cost of energy consumed by the aggregate VRF system subject to the indoor subsystem temperature constraints and other constraints provided by the high-level models described herein. For example, the high-level optimization can formulate the high-level optimization problem as:

$$\min_{x,u,\dot{W}_{peak}} \sum_{k=0}^{N-1} c_k \left( \eta_{HVAC} \dot{Q}_{HVAC,k} + \eta_{air} \sum_{b=1}^{n_b} \dot{Q}_{c,b,k} \right) \Delta + c_{peak} \dot{W}_{peak}$$

subject to the following constraints:

$$C_b \frac{dT_b}{dt} = -H_b(T_b - T_a) - \dot{Q}_{c,b} + \dot{Q}_{other,b}$$

$$\frac{ds}{dt} = -\sigma s + \dot{Q}_{storage}$$

$$\dot{Q}_{HVAC,k} = \sum_{b=1}^{b_n} \dot{Q}_{c,b,k} + \dot{Q}_{storage,k}$$

$$0 \leq \left( \eta_{HVAC} \dot{Q}_{HVAC,k} + \eta_{air} \sum_{b=1}^{n_b} \dot{Q}_{c,b,k} \right) \leq \dot{W}_{peak}$$

$$\dot{W}_{peak,past} \leq \dot{W}_{peak}$$

$$0 \leq \dot{Q}_{HVAC,k} \leq \dot{Q}_{HVAC,max}$$

$$0 \leq s_k \leq s_{max}$$

$$T_{min} \leq T_b \leq T_{max}$$

Still referring to FIG. 9, flow diagram 900 is shown to include providing the optimal indoor subsystem load profiles $\dot{Q}_{c,b}$ from the high-level MPC to a plurality of low-level indoor MPCs (block 904). Each load profile $\dot{Q}_{c,b}$ can be sent from high-level MPC 608 to one of low-level indoor MPCs 612-616, as shown in FIG. 6. In some embodiments, each low-level indoor MPC is configured to monitor and control a particular indoor subsystem. Each low-level indoor MPC can receive the optimal subsystem load profile for the indoor subsystem monitored and controlled by that low-level indoor MPC.

Flow diagram 900 is shown to include performing a low-level optimization at each of the low-level indoor MPCs to generate optimal refrigerant flow setpoints for each indoor VRF unit of the indoor subsystem (block 906). In some embodiments, the low-level optimization in block 906 includes generating a zone temperature model for each zone i of each indoor subsystem. The zone temperature model can define a relationship between the temperature $T_i$ of the zone and the thermal energy load profile $\dot{Q}_{c,i}$ for the zone. An example of such a zone temperature model is shown in the following equation:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

where $C_i$ and $T_i$ are the thermal capacitance and temperature of the building zone designated by zone index i, $T_a$ is the ambient air temperature outside zone i (e.g., outside air temperature), $H_i$ is the heat transfer coefficient between zone i and the ambient air, $\dot{Q}_{c,i}$ is the amount of cooling applied to the building zone i by MPC system 600 (i.e., the amount of heat removed from the zone), and $\dot{Q}_{other,i}$ is the external load, radiation, or disturbance experienced by zone i. If heating is provided to the zone rather than cooling, the sign on $\dot{Q}_{c,i}$ can be switched from a negative sign to a positive sign.

The parameter $\beta_{ij}$ characterizes the degree of coupling between zone i and another zone j (e.g., a building zone adjacent to zone i). If zones i and j are not adjacent and/or do not directly exchange heat with each other, zone temperature modeler 814 can set the value of $\beta_{ij}$ equal to zero. The zone temperature model can include a summation of the heat transfers between building zone i and each other building zone j≠i as a function of the zone temperatures $T_i$ and $T_j$ and the coupling coefficient $\beta_{ij}$. In other embodiments, heat transfer between zones can be accounted for using the external disturbance estimate $\dot{Q}_{other,i}$.

The low-level optimization can include using the zone disturbance estimates received from zone disturbance predictor 824 to identify appropriate values of the external disturbance $\dot{Q}_{other,i}$ for each zone i at each time step of the optimization period. In some embodiments, the low-level optimization uses the weather forecasts from weather service 604 and/or the load and rate predictions provided by load/rate predictor 602 to determine appropriate values for the ambient air temperature $T_a$ and/or the external disturbance $\dot{Q}_{other,i}$ for each zone i at each time step of the optimization period. Values of $C_i$ and $H_i$ can be specified as parameters of the zone i, received from the BMS that manages the building zone i, received from a user, retrieved from memory 808, or otherwise provided to zone temperature modeler 814.

In some embodiments, the low-level optimization in block 906 includes generating a model of the total amount of thermal energy delivered to the indoor subsystem $Q_{total}$ (e.g., the total amount of heating or cooling delivered to the indoor subsystem) as a function of the individual zone loads $\dot{Q}_{c,i}$. In some embodiments, the low-level optimization includes modeling the total indoor subsystem load using the following equation:

$$\frac{dQ_{total}}{dt} = \sum_{i=1}^{n_z} \dot{Q}_{c,i}$$

where $Q_{total}$ is the total amount of thermal energy (e.g., heating or cooling) delivered to the indoor subsystem and $\dot{Q}_{c,i}$ is the rate at which thermal energy is being delivered (units of power) of a particular zone i. The indoor subsystem load model can sum the thermal energy loads $\dot{Q}_{c,i}$ of each building zone to calculate the total indoor subsystem thermal energy load $$\frac{dQ_{total}}{dt},$$

which is the derivative of the total amount of thermal energy $Q_{total}$ delivered to the indoor subsystem.

In some embodiments, the low-level optimization includes generating one or more models that define the thermal energy load $\dot{Q}_{c,i}$ of each building zone as a function of the zone temperature $T_i$ and the zone setpoint $u_i$ as shown in the following equation:

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described. The models generated by the low-level optimization can be used as optimization constraints to ensure that the thermal energy load $\dot{Q}_{c,i}$ is not reduced to a value that would cause the zone temperature $T_i$ to deviate from an acceptable or comfortable temperature range.

In some embodiments, the low-level optimization in block 906 seeks to minimize the total amount of thermal energy $Q_{total,N}$ used by the indoor subsystem over the optimization period subject to the zone temperature constraints and other constraints provided by the low-level indoor models described herein. For example, the low-level optimization can formulate the low-level optimization problem as:

$$\min_{x,u} Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$\frac{Q_{total,k+1} - Q_{total,k}}{\Delta} \leq \dot{Q}_{c,b,k}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

Still referring to FIG. 9, flow diagram 900 is shown to include using the optimal refrigerant flow setpoints to the indoor VRF units in each of the indoor subsystems (block 908). For example, each low-level indoor MPC 612-616 can operate the indoor VRF units located in the corresponding indoor subsystem 632-636. Operating the indoor VRF units can include activating or deactivating the indoor VRF units, adjusting a refrigerant flow rate, adjusting a fan speed, or otherwise controlling the indoor VRF units to achieve the refrigerant flow setpoints.

Figure 10:
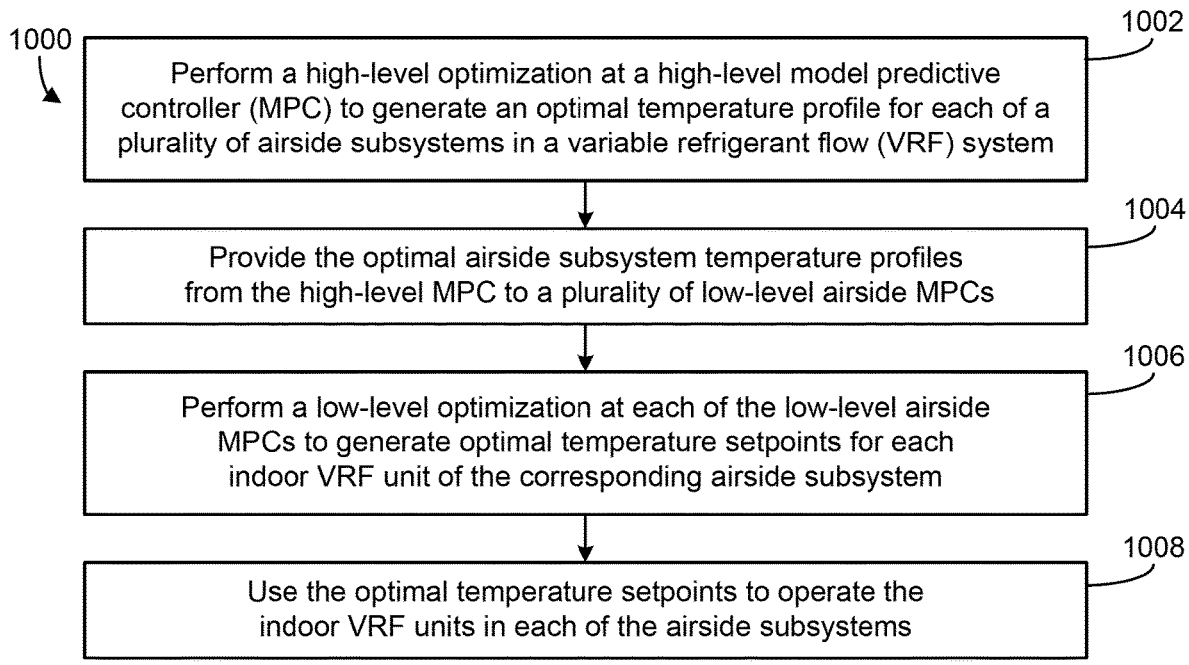
FIG. 10 is another flow diagram of a high-level and distributed low-level model predictive control technique which can be used to optimize energy cost in the MPC system of FIG. 6 when the low-level optimizations track temperature profiles provided by the high-level optimization, according to some embodiments.

Referring now to FIG. 10, a flow diagram 1000 illustrating a model predictive control technique which can be performed by MPC system 600 is shown, according to some embodiments. Flow diagram 1000 is shown to include performing a high-level optimization at a high-level model predictive controller (MPC) to generate an optimal temperature profile for each of a plurality of indoor subsystems in a variable refrigerant flow (VRF) system (block 1002). In some embodiments, the high-level optimization is performed by high-level MPC 608, as described with reference to FIGS. 6-7. The high-level optimization can be the same or similar to the high-level optimization described with reference to FIG. 9.

The high-level optimization in block 1002 can generate an optimal temperature profile $\hat{T}_b$ for each indoor subsystem. The optimal temperature profile $\hat{T}_b$ can include a vector of predicted temperature states $\hat{T}_b$ for each low-level indoor subsystem 632-636. Each vector of predicted temperature states $\hat{T}_b$ can include a predicted indoor subsystem temperature state $\hat{T}_{b,k}$ for each time step k during the optimization period. Temperature states $\hat{T}_{b,k}$ can be predicted using any of a variety of predictive techniques including, for example, a Kalman filter as described in U.S. Pat. No. 9,235,657.

Flow diagram 1000 is shown to include providing the optimal indoor subsystem temperature profiles $\hat{T}_b$ from the high-level MPC to a plurality of low-level indoor MPCs (block 1004). Each subsystem temperature profiles $\hat{T}_b$ can be sent from high-level MPC 608 to one of low-level indoor MPCs 612-616. In some embodiments, each low-level indoor MPC is configured to monitor and control a particular indoor subsystem. Each low-level indoor MPC can receive the optimal subsystem temperature profile $\hat{T}_b$ for the indoor subsystem monitored and controlled by that low-level indoor MPC.

Flow diagram 1000 is shown to include performing a low-level optimization at each of the low-level indoor MPCs to generate optimal temperature setpoints for each indoor VRF unit of the corresponding indoor subsystem (block 1006). The low-level optimization in block 1006 can be similar to the low-level optimization in block 906. However, the low-level optimization in block 1006 can formulate the low-level optimization problem to track the optimal temperatures generated by the high-level optimization in block 1002 rather than minimizing total amount of thermal energy used.

In some embodiments, the low-level optimization in block 1006 can be formulated as:

$$\min_{x,u} \sum_{k=1}^{N} \frac{1}{2}\|T_{b,k} - \hat{T}_{b,k}\|^2 + \mu Q_{total,N}$$

subject to the following constraints:

$$C_i \frac{dT_i}{dt} = -H_i(T_i - T_a) - \sum_{j \neq i} \beta_{ij}(T_i - T_j) - \dot{Q}_{c,i} + \dot{Q}_{other,i}$$

$$\frac{dQ_{total}}{dt} = \sum_{i=1}^{n_z} \dot{Q}_{c,i}$$

$$T_{min} \leq T_i \leq T_{max}$$

$$Q_{total,k+1} - Q_{total,k} \geq 0$$

$$\dot{Q}_{c,i} = f(T_i, u_i)$$

where the function $f$ is defined according to relationships between the zone thermal energy load $\dot{Q}_{c,i}$ and the zone setpoint $u_i$ (e.g., zone temperature setpoint $T_{sp,i}$ or operating mode $z_i$ and refrigerant flow rate $m_i$) as previously described.

Still referring to FIG. 10, flow diagram 1000 is shown to include using the optimal temperature setpoints to operate the indoor VRF units in each of the indoor subsystems (block 1008). For example, each low-level indoor MPC 612-616 can operate the indoor VRF units located in the corresponding indoor subsystem 632-636. Operating the indoor VRF units can include activating or deactivating the indoor VRF units, adjusting a refrigerant flow rate, adjusting a fan speed, or otherwise controlling the indoor VRF units to achieve the refrigerant flow setpoints.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating, ventilation, or air conditioning (HVAC) system for a building, the HVAC system comprising:
a plurality of indoor subsystems, each indoor subsystem comprising one or more indoor units configured to provide heating or cooling to one or more building spaces;
a high-level controller configured to generate a plurality of indoor subsystem energy targets, each indoor subsystem energy target corresponding to one of the plurality of indoor subsystems and generated based on a thermal capacitance of one or more building spaces to which heating or cooling is provided by the corresponding indoor subsystem; and
a plurality of low-level indoor controllers, each corresponding to one of the indoor subsystems and configured to generate indoor setpoints for the one or more indoor units of the corresponding indoor subsystem using the indoor subsystem energy target for the corresponding indoor subsystem;
wherein each of the plurality of low-level indoor controllers is configured to operate the one or more indoor units of the corresponding indoor subsystem using the indoor setpoints.

2. The HVAC system of claim 1, wherein the high-level controller is configured to generate the plurality of indoor subsystem energy targets using a plurality of heat transfer models, each heat transfer model corresponding to one of the plurality of indoor subsystems and defining a relationship between:
the indoor subsystem energy target for the corresponding indoor subsystem;
a temperature of the one or more building spaces predicted to result from the indoor subsystem energy target for the corresponding indoor subsystem; and
the thermal capacitance of the one or more building spaces to which heating or cooling is provided by the corresponding indoor subsystem.

3. The HVAC system of claim 1, wherein:
each of the indoor subsystem energy targets comprises an amount of thermal energy to be added to the one or more building spaces or removed from the one or more building spaces of the corresponding indoor subsystem at each of a plurality of time steps in a time period; and
each low-level indoor controller is configured to use the amount of thermal energy to be added or removed by the corresponding indoor subsystem as a constraint when generating the indoor setpoints.

4. The HVAC system of claim 1, wherein the indoor units comprise one or more variable refrigerant flow (VRF) units and the indoor setpoints comprise at least one of:
refrigerant flow setpoints for each of the one or more indoor VRF units; or
temperature setpoints for one or more building zones controlled by the one or more indoor VRF units.

5. The HVAC system of claim 1, wherein:
each indoor subsystem comprises a plurality of indoor VRF units; and
each of the low-level indoor controllers is configured to:
generate refrigerant flow decisions for each of the plurality of indoor VRF units in the corresponding indoor subsystem; and
use the refrigerant flow decisions to calculate at least one of flow setpoints, temperature setpoints, or valve setpoints for each of the plurality of indoor VRF units.

6. The HVAC system of claim 1, wherein:
each indoor subsystem comprises a plurality of building zones; and
each of the low-level indoor controllers is configured to generate indoor temperature setpoints for each of the plurality of building zones in the corresponding indoor subsystem.

7. The HVAC system of claim 1, wherein:
the high-level controller is configured to generate predicted temperature profiles for each indoor subsystem resulting from the indoor subsystem energy targets; and
the low-level indoor controllers are configured to generate the indoor setpoints by reducing an error between indoor subsystem temperatures and the predicted temperature profiles.

8. The HVAC system of claim 1, wherein the indoor subsystems are located in separate buildings thermally decoupled from one another such that no direct heat exchange occurs between the indoor subsystems.

9. The HVAC system of claim 1, further comprising:
an outdoor subsystem comprising one or more outdoor units; and
a low-level outdoor controller configured to generate outdoor setpoints for the one or more outdoor units and use the outdoor setpoints to operate the one or more outdoor units;
wherein the high-level controller is configured to generate an outdoor unit energy target for the outdoor subsystem and the low-level outdoor controller is configured to generate the outdoor setpoints subject to a demand constraint based on the outdoor unit energy target.

10. The HVAC system of claim 9, wherein the high-level controller is configured to determine:
a thermal energy allocation to each of the plurality of indoor subsystems at each of a plurality of time steps in a time period; and
a thermal energy or refrigerant state allocation of the outdoor subsystem at each of the plurality of time steps in the time period.

11. A method for operating a heating, ventilation, or air conditioning (HVAC) system for a building, method comprising:
generating a plurality of indoor subsystem energy targets at a high-level controller, each indoor subsystem energy target corresponding to one of a plurality of indoor subsystems and generated based on a thermal capacitance of one or more building spaces to which heating or cooling is provided by one or more indoor units of the corresponding indoor subsystem;
distributing the plurality of indoor subsystem energy targets to a plurality of low-level indoor controllers, each low-level indoor controller corresponding to one of the indoor subsystems;
generating, by each of the plurality of low-level indoor controllers, indoor setpoints for the one or more indoor units of the corresponding indoor subsystem using the indoor subsystem energy target for the corresponding indoor subsystem; and
operating, by each of the plurality of low-level indoor controllers, the one or more indoor units of the corresponding indoor subsystem using the indoor setpoints.

12. The method of claim 11, wherein the plurality of indoor subsystem energy targets are generated using a plurality of heat transfer models, each heat transfer model corresponding to one of the plurality of indoor subsystems and defining a relationship between:

the indoor subsystem energy target for the corresponding indoor subsystem;

a temperature of the one or more building spaces predicted to result from the indoor subsystem energy target for the corresponding indoor subsystem; and the thermal capacitance of the one or more building spaces to which heating or cooling is provided by the corresponding indoor subsystem.

13. The method of claim 11, wherein:

each of the indoor subsystem energy targets comprises an amount of thermal energy to be added to the one or more building spaces or removed from the one or more building spaces of the corresponding indoor subsystem at each of a plurality of time steps in a time period; and the indoor setpoints are generated using the amount of thermal energy to be added or removed by the corresponding indoor subsystem as a constraint.

14. The method of claim 11, wherein the indoor units comprise one or more variable refrigerant flow (VRF) units and the indoor setpoints comprise at least one of:

refrigerant flow setpoints for each of the one or more indoor VRF units; or temperature setpoints for one or more building zones controlled by the one or more indoor VRF units.

15. The method of claim 11, wherein:

each indoor subsystem comprises a plurality of indoor VRF units; and generating the indoor setpoints comprises:

generating refrigerant flow decisions for each of the plurality of indoor VRF units in the corresponding indoor subsystem; and using the refrigerant flow decisions to calculate at least one of flow setpoints, temperature setpoints, or valve setpoints for each of the plurality of indoor VRF units.

16. The method of claim 11, wherein:

each indoor subsystem comprises a plurality of building zones; and generating the indoor setpoints comprises generating indoor temperature setpoints for each of the plurality of building zones in the corresponding indoor subsystem.

17. The method of claim 11, further comprising generating predicted temperature profiles for each indoor subsystem predicted to result from the indoor subsystem energy targets;

wherein generating the indoor setpoints comprises reducing an error between indoor subsystem temperatures and the predicted temperature profiles.

18. The method of claim 11, wherein the indoor subsystems are located in separate buildings thermally decoupled from one another such that no direct heat exchange occurs between the indoor subsystems.

19. A heating, ventilation, or air conditioning (HVAC) system for a building, the HVAC system comprising:

a plurality of indoor subsystems, each indoor subsystem comprising one or more indoor units configured to provide heating or cooling to one or more building spaces;

a high-level controller configured to determine an amount of heating or cooling to be provided by each of the plurality of indoor subsystems using a plurality of heat transfer models, each heat transfer model corresponding to one of the plurality of indoor subsystems and defining a relationship between:

the amount of heating or cooling provided to the one or more building spaces of the corresponding indoor subsystem; and a temperature of the one or more building spaces predicted to result from the amount of heating or cooling provided by the corresponding indoor subsystem;

wherein the relationship accounts for thermal energy storage within at least one of air mass, shallow mass, or deep mass within the one or more building spaces; and a plurality of low-level indoor controllers, each corresponding to one of the indoor subsystems and configured to control the one or more indoor units of the corresponding indoor subsystem to provide the amount of heating or cooling determined by the high-level controller.

20. The HVAC system of claim 19, wherein each heat transfer model defines the relationship between the amount of heating or cooling provided to the one or more building spaces and the temperature of the one or more building spaces to which heating or cooling is provided as a function of a thermal capacitance of the one or more building spaces to which heating or cooling is provided.

* * * * *